US012678723B2

(12) United States Patent
Shibuya et al.

(10) Patent No.: US 12,678,723 B2
(45) Date of Patent: Jul. 14, 2026

(54) AIR FILTER MEDIUM, FILTER PACK, AIR FILTER UNIT, AND METHOD FOR PRODUCING THE SAME

(71) Applicant: DAIKIN INDUSTRIES, LTD., Osaka (JP)

(72) Inventors: Yoshiyuki Shibuya, Osaka (JP); Kunihiko Inui, Osaka (JP); Seigo Yamamoto, Osaka (JP); Hideyuki Kiyotani, Osaka (JP); Toshihiro Kanda, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 332 days.

(21) Appl. No.: 17/280,625

(22) PCT Filed: Sep. 25, 2019

(86) PCT No.: PCT/JP2019/037642
§ 371 (c)(1),
(2) Date: Mar. 26, 2021

(87) PCT Pub. No.: WO2020/067182
PCT Pub. Date: Apr. 2, 2020

(65) Prior Publication Data
US 2022/0040614 A1    Feb. 10, 2022

(30) Foreign Application Priority Data
Sep. 28, 2018    (JP) .................................. 2018-184328

(51) Int. Cl.
| | |
|---|---|
| *B01D 39/16* | (2006.01) |
| *B01D 46/00* | (2022.01) |
| *B01D 46/52* | (2006.01) |

(52) U.S. Cl.
CPC ..... *B01D 39/1692* (2013.01); *B01D 46/0001* (2013.01); *B01D 46/522* (2013.01);
(Continued)

(58) Field of Classification Search
None
See application file for complete search history.

(56) References Cited

U.S. PATENT DOCUMENTS

| | | | |
|---|---|---|---|
| 6,416,562 B1 * | 7/2002 | Shibuya ............. | B01D 39/1623 |
| | | | 55/528 |
| 2013/0197664 A1 * | 8/2013 | Ballard .................. | B01D 39/04 |
| | | | 623/23.72 |

(Continued)

FOREIGN PATENT DOCUMENTS

| | | | | |
|---|---|---|---|---|
| CN | 105793300 A | * | 7/2016 | ............. B29C 55/04 |
| EP | 2 583 735 A1 | | 4/2013 | |

(Continued)

OTHER PUBLICATIONS

JP2016123972A_ENG (Espacenet machine translation of Sakano) (Year: 2016).*

(Continued)

*Primary Examiner* — Youngsul Jeong
(74) *Attorney, Agent, or Firm* — Birch, Stewart, Kolasch & Birch, LLP

(57) ABSTRACT

An air filter medium having a large thickness and a low filling factor, a filter pack, an air filter unit, and methods for producing the air filter medium, the filter pack, and the air filter unit are provided. The air filter medium includes a fluororesin porous film having a portion with a filling factor of 3.5% or less, and the portion with a filling factor of 3.5% or less has a thickness of 45 µm or more.

18 Claims, 5 Drawing Sheets

(52) U.S. Cl.
    CPC .... *B01D 2239/065* (2013.01); *B01D 2239/10* (2013.01); *B01D 2239/1216* (2013.01); *B01D 2239/1241* (2013.01); *B01D 2239/1291* (2013.01)

(56) References Cited

U.S. PATENT DOCUMENTS

| | | | |
|---|---|---|---|
| 2017/0348626 A1 * | 12/2017 | Sakano | .............. B01D 69/1212 |
| 2020/0030734 A1 | 1/2020 | Hara et al. | |

FOREIGN PATENT DOCUMENTS

| | | | | |
|---|---|---|---|---|
| EP | 2 752 230 A1 | 7/2014 | | |
| EP | 2 840 115 A1 | 2/2015 | | |
| JP | 2001-170461 A | 6/2001 | | |
| JP | 2012161741 A * | 8/2012 | ............. | B01D 63/14 |
| JP | 2016123972 A * | 7/2016 | ............. | B01D 39/16 |
| JP | 2017159281 A * | 9/2017 | ............. | B01D 39/16 |
| WO | WO 2016/104589 A1 | 6/2016 | | |
| WO | WO 2018/131573 A1 | 7/2018 | | |

OTHER PUBLICATIONS

CN105793300A_ENG (Espacenet machine translation of Yamanaka) (Year: 2016).*

JP2017159281A_ENG (Espacenet machine translation of Sakano) (Year: 2017).*

JP2012161741A_ENG (Espacenet machine translation of Ishizuka) (Year: 2012).*

International Preliminary Report on Patentability and English translation of the Written Opinion of the International Searching Authority, for International Application No. PCT/JP2019/037642, dated Apr. 8, 2021.

Extended European Search Report dated Jun. 22, 2022 for Application No. 19866134.0.

* cited by examiner

30

31

33

30

31 {

31a

31b

33

30

30

30

33a

31

33b

20

30

AIR FILTER MEDIUM, FILTER PACK, AIR FILTER UNIT, AND METHOD FOR PRODUCING THE SAME

TECHNICAL FIELD

The present disclosure relates to an air filter medium, a filter pack, an air filter unit, and methods for producing the air filter medium, the filter pack, and the air filter unit.

BACKGROUND ART

In the related art, for example, porous films (hereafter referred to as PTFE porous films) formed of polytetrafluoroethylene (hereafter referred to as PTFE) are used as dust-collecting filters to provide a sufficiently cleaned space. Such a PTFE porous film has a higher collection efficiency of dust than glass fiber filter medium at the same pressure loss, and therefore is particularly suitably used for HEPA filters (high efficiency particulate air filters) and ULPA filters (ultra low penetration air filters).

For example, an air filter medium that is disclosed in PTL 1 (Japanese Unexamined Patent Application Publication No. 2001-170461) and that includes a PTFE porous film having a thickness of about 10 μm to achieve a filling factor of about 5% and a higher dust-holding capacity has been proposed as such a filter.

SUMMARY OF INVENTION

Technical Problem

However, a fluororesin porous film having a larger thickness and a lower filling factor has not been provided so far.

In view of the foregoing, it is an object of the present disclosure to provide an air filter medium having a large thickness and a low filling factor, a filter pack, an air filter unit, and methods for producing the air filter medium, the filter pack, and the air filter unit.

Solution to Problem

An air filter medium according to a first aspect includes a fluororesin porous film. The fluororesin porous film has a portion with a filling factor of 3.5% or less. The portion with a filling factor of 3.5% or less of the fluororesin porous film has a thickness of 45 μm or more.

It is sufficient that the portion with a filling factor of 3.5% or less of the fluororesin porous film has a thickness of 45 μm or more. The fluororesin porous film may be constituted by a single porous film having substantially no change in filling factor in the air flow direction, a single porous film having a change in filling factor in the air flow direction, or a laminate of a plurality of porous films having substantially no change or a change in filling factor in the air flow direction.

This air filter medium can have a large thickness and a low filling factor.

An air filter medium according to a second aspect is the air filter medium according to the first aspect, wherein the fluororesin porous film has a portion with a filling factor of 2.5% or less. The portion with a filling factor of 2.5% or less of the fluororesin porous film has a thickness of 50 μm or more.

It is sufficient that the portion with a filling factor of 2.5% or less of the fluororesin porous film has a thickness of 50 μm or more. The fluororesin porous film may be constituted by a single porous film having substantially no change in filling factor in the air flow direction, a single porous film having a change in filling factor in the air flow direction, or a laminate of a plurality of porous films having substantially no change or a change in filling factor in the air flow direction.

This air filter medium can have a sufficient thickness and a lower filling factor.

An air filter medium according to a third aspect is the air filter medium according to the first aspect or the second aspect, wherein a PF value calculated from formula PF={−log((100−collection efficiency (%))/100)}/(pressure loss (Pa)/1000) using pressure loss and collection efficiency determined from polyalphaolefin particles having a particle size of 0.3 μm is 17 or more.

In this air filter medium, a high PF value can be achieved for air filter medium including a fluororesin porous film having a large thickness and a low filling factor.

An air filter medium according to a fourth aspect is the air filter medium according to any one of the first aspect to the third aspect, wherein the dust-holding capacity of polyalphaolefin particles having a number median diameter of 0.25 μm at which pressure loss increases by 250 Pa when air containing the polyalphaolefin particles is continuously passed through the air filter medium at a flow velocity of 5.3 cm/s is 30.0 g/m² or more.

The dust-holding capacity is more preferably 50.0 g/m² or more.

In this air filter medium, a high dust-holding capacity can be achieved for air filter medium including a fluororesin porous film having a large thickness and a low filling factor.

An air filter medium according to a fifth aspect is the air filter medium according to any one of the first aspect to the fourth aspect and has a pressure loss of 200 Pa or less when air is passed through the air filter medium at a flow velocity of 5.3 cm/s.

In this air filter medium, the pressure loss can be suppressed for air filter medium including a fluororesin porous film having a large thickness and a low filling factor.

An air filter medium according to a sixth aspect is the air filter medium according to any one of the first aspect to the fifth aspect, wherein the first fluororesin porous film has a mean flow pore size of 2.5 μm or more.

In this air filter medium, the dust-holding capacity can be increased for air filter medium including a fluororesin porous film having a large thickness and a low filling factor.

An air filter medium according to a seventh aspect is the air filter medium according to any one of the first aspect to the sixth aspect, wherein the fluororesin porous film includes a first fluororesin porous film and a second fluororesin porous film. The first fluororesin porous film has a filling factor of 3.5% or less and a thickness of 45 μm or more. The second fluororesin porous film is disposed on the downstream side of an air flow with respect to the first fluororesin porous film. The second fluororesin porous film has a filling factor equal to or higher than that of the first fluororesin porous film.

The second fluororesin porous film preferably has a higher filling factor than the first fluororesin porous film.

Each of the first fluororesin porous film and the second fluororesin porous film may have substantially no change in filling factor in the air flow direction.

In this air filter medium, the first fluororesin porous film having a large thickness and a low filling factor is disposed on the upstream side with respect to the second fluororesin porous film. Therefore, the dust-holding capacity can be increased while clogging in the second fluororesin porous film is suppressed.

An air filter medium according to an eighth aspect is the air filter medium according to any one of the first aspect to the seventh aspect, wherein the fluororesin porous film includes at least one gradient density porous film having a higher density on a downstream side of an air flow than on an upstream side of the air flow.

The density of the gradient density porous film may change gradually or stepwise from the upstream side to the downstream side of the air flow.

The term "one porous film" herein does not include a porous film obtained by, for example, bonding a plurality of porous films.

The gradient density porous film is not limited, and may be obtained by, for example, performing drawing in a state in which the temperature on one side is different from that on the other side or performing drawing after heat treatment at different temperatures between one side and the other side.

In this air filter medium, the fluororesin porous film having a large thickness and a low filling factor collects relatively large dust on the upstream side of an air flow and collects relatively small dust on the downstream side of the air flow. Therefore, high dust-holding capacity can be achieved while clogging is suppressed.

An air filter medium according to a ninth aspect is the air filter medium according to any one of the first aspect to the sixth aspect, wherein the fluororesin porous film is a single porous film having a filling factor of 3.5% or less and a thickness of 45 μm or more.

The term "single porous film" herein does not include a porous film obtained by, for example, bonding a plurality of porous films.

For the single fluororesin porous film, a PF value calculated from the formula PF={−log((100−collection efficiency (%))/100)}/(pressure loss (Pa)/1000) using the pressure loss and collection efficiency determined from polyalphaolefin particles having a particle size of 0.3 μm is preferably 17 or more.

For the single fluororesin porous film, the dust-holding capacity of polyalphaolefin particles having a number median diameter of 0.25 μm at which the pressure loss increases by 250 Pa when air containing the polyalphaolefin particles is continuously passed through the fluororesin porous film at a flow velocity of 5.3 cm/s is preferably 30.0 g/m² or more and more preferably 50.0 g/m² or more.

For the single fluororesin porous film, the pressure loss at which air is passed through the fluororesin porous film at a flow velocity of 5.3 cm/s is preferably 200 Pa or less.

In this air filter medium, a fluororesin porous film has a large thickness and a low filling factor.

For example, when such a single fluororesin porous film is disposed on the upstream side of the air flow together with a separately provided air filter medium having a higher filling factor, the load on the air filter medium on the downstream side can be reduced.

An air filter medium according to a tenth aspect is the air filter medium according to any one of the first aspect to the ninth aspect and further includes a pre-collection film. The pre-collection film is disposed on the upstream side of an air flow with respect to the fluororesin porous film. For the pre-collection film, the pressure loss at which air is passed through the pre-collection film at a flow velocity of 5.3 cm/s is 15 Pa or more and 55 Pa or less. For the pre-collection film, the collection efficiency of polyalphaolefin particles having a particle size of 0.3 μm at which air containing the polyalphaolefin particles is passed through the pre-collection film at a flow velocity of 5.3 cm/s is 25% or more and less than 80%. For the pre-collection film, a PF value calculated from the formula PF={−log((100−collection efficiency (%))/100)}/(pressure loss (Pa)/1000) using the pressure loss and collection efficiency determined from polyalphaolefin particles having a particle size of 0.3 μm is 7 or more and 15 or less.

Such a pre-collection film is not limited, and may have a thickness of, for example, 0.4 mm or less. When the air filter medium includes the first fluororesin porous film and the second fluororesin porous film, the value of "PF value of pre-collection film/PF value measured when the first fluororesin porous film and the second fluororesin porous film are stacked", which is a ratio of the PF value of the pre-collection film to the PF value obtained when the first fluororesin porous film and the second fluororesin porous film are stacked, is preferably 0.20 or more and 0.45 or less.

In this air filter medium, sufficient dust-holding capacity can be achieved while a pre-collection film is further used.

The air filter medium according to the first aspect to the ninth aspect preferably do not include the above-described pre-collection film from the viewpoint of achieving sufficient dust-holding capacity while decreasing the thickness of the air filter medium. When the air filter medium is used in an air filter unit in a folded manner, the air filter medium preferably does not include the above-described pre-collection film from the viewpoint of increasing the total area of portions in which the air filter medium is to be folded and from the viewpoint of increasing the intervals of mountain folds to suppress an increase in pressure loss.

An air filter medium according to an eleventh aspect is the air filter medium according to any one of the first aspect to the tenth aspect, wherein at least the portion with a filling factor of 3.5% or less of the fluororesin porous film contains a modified polytetrafluoroethylene.

At least the portion with a filling factor of 3.5% or less of the fluororesin porous film may contain both a modified polytetrafluoroethylene and a homo-polytetrafluoroethylene.

In this air filter medium, at least the portion with a filling factor of 3.5% or less of the fluororesin porous film contains a modified polytetrafluoroethylene, and thus the filling factor is easily decreased.

An air filter medium according to a twelfth aspect is the air filter medium according to any one of the first aspect to the eleventh aspect and includes a fluororesin porous film mainly constituted by a fibril-forming polytetrafluoroethylene, a non-fibril-forming non-melting-processable component, and a non-fibril-forming melting-processable component having a melting point of lower than 320° C.

PTFE porous films mainly constituted by only a known fibril-forming PTFE (high-molecular-weight PTFE) include many minute fibrils having a small fiber diameter and have a large surface area per one fiber, and thus have high collection efficiency. However, such PTFE porous films have a relatively small thickness and include many fibers that overlap each other, and thus cannot hold a large amount of fine particles. Consequently, high collection efficiency per one fiber is not effectively exhibited.

In contrast, this air filter medium mainly includes three components: a fibril-forming polytetrafluoroethylene, a non-fibril-forming non-melting-processable component, and a non-fibril-forming melting-processable component having a melting point of lower than 320° C. Therefore, this air filter medium includes relatively thicker fibers and thus has a higher porosity and a larger thickness than known PTFE porous films. Thus, the dust-holding capacity can be increased.

An air filter medium according to a thirteenth aspect is the air filter medium according to any one of the first aspect to the twelfth aspect and further includes an air-permeable supporting layer disposed on the upstream side and/or the downstream side of an air flow with respect to the fluororesin porous film.

The air-permeable supporting layer may be disposed on both the upstream side and the downstream side of the air flow with respect to the fluororesin porous film.

The air-permeable supporting layer is not limited, but preferably has a pressure loss (for example, less than half or one-tenth the pressure loss) lower than that of the fluororesin porous film.

This air filter medium includes the air-permeable supporting layer, and thus the strength can be increased.

An air filter pack according to a fourteenth aspect includes the air filter medium according to any one of the first aspect to the thirteenth aspect, wherein the air filter medium is processed so as to have a zigzag shape in which mountain folds and valley folds are alternately repeated. The "filter pack" is not limited, and has, for example, a zigzag shape folded by alternately performing mountain folding and valley folding unlike a flat sheet-like shape. The filter pack may have a shape adjusted so as to be accommodated in a particular frame body.

An air filter unit according to an fifteenth aspect includes the air filter medium according to any one of the first aspect to the thirteenth aspect or the filter pack according to the fourteenth aspect and a frame body holding the air filter medium or the filter pack.

A method for producing an air filter medium according to a sixteenth aspect includes a step of providing an unbaked film containing polytetrafluoroethylene and a step of obtaining a porous film. In the step of obtaining a porous film, the unbaked film is drawn in a first direction and then in a second direction orthogonal to the first direction. Herein, before drawing the unbaked film in the first direction, the unbaked film is heated in an atmosphere at a temperature of 250° C. or higher and 325° C. or lower for one minute or longer.

According to this production method, an air filter medium including a fluororesin porous film having a large thickness and a low filling factor can be provided.

A method for producing an air filter medium according to a seventeenth aspect includes a step of providing an unbaked film containing polytetrafluoroethylene and a step of obtaining a porous film. In the step of obtaining a porous film, the unbaked film is drawn such that the unbaked film after drawing has a portion drawn at a drawing speed of 30%/s or less in a drawing direction.

In the case of biaxial drawing, it is sufficient that a drawing speed of 30%/s or less is achieved in any of the machine direction and the transverse direction. Furthermore, in the case where drawing is consecutively or simultaneously performed in the machine direction and the transverse direction in a plane using a table test apparatus or the like, it is sufficient that a drawn portion that satisfies the above drawing speed is provided in any of the machine direction and the transverse direction.

The drawing speed is a value obtained by dividing a drawing ratio (%) by the time (second) required for the drawing (longitudinal drawing in the case of longitudinal drawing, transverse drawing in the case of transverse drawing, or at least one of longitudinal drawing and transverse drawing in the case of simultaneous longitudinal and transverse drawing).

The drawing ratio (%) is a ratio (length after drawing/ length before drawing) of the length of the unbaked film after drawing to the length of the unbaked film before drawing. In the case of longitudinal drawing, the drawing ratio is a ratio of lengths before and after longitudinal drawing. In the case of transverse drawing, the drawing ratio is a ratio of lengths before and after transverse drawing. In the case of simultaneous longitudinal and transverse drawing, the drawing ratio is at least one of a ratio of lengths before and after longitudinal drawing and a ratio of lengths before and after transverse drawing.

According to this production method, an air filter medium including a fluororesin porous film having a large thickness and a low filling factor can be provided.

A method for producing a filter pack according to an eighteenth aspect includes a step of processing an air filter medium obtained by the method for producing an air filter medium according to the sixteenth aspect or the seventeenth aspect into a zigzag shape by alternately repeating mountain folding and valley folding.

A method for producing an air filter unit according to a nineteenth aspect includes a step of holding, in a frame body, an air filter medium obtained by the method for producing an air filter medium according to the sixteenth aspect or the seventeenth aspect or a filter pack obtained by the method for producing a filter pack according to the eighteenth aspect.

DESCRIPTION OF EMBODIMENTS

Hereafter, an air filter medium (hereafter also simply referred to as a filter medium), a filter pack, an air filter unit, and methods for producing the air filter medium, the filter pack, and the air filter unit will be described based on examples.

(1) Air Filter Medium

The pressure loss of the air filter medium is not limited, and is preferably, for example, less than 200 Pa. The pressure loss may be 20 Pa or more and 185 Pa or less and is preferably 40 Pa or more and 150 Pa or less.

For the air filter medium, a PF value calculated from the formula PF={−log((100−collection efficiency (%))/100)}/ (pressure loss (Pa)/1000) using the pressure loss and collection efficiency determined from polyalphaolefin particles having a particle size of 0.3 μm is preferably 17 or more.

For the air filter medium, the dust-holding capacity of polyalphaolefin particles having a number median diameter of 0.25 μm at which the pressure loss increases by 250 Pa when air containing the polyalphaolefin particles is continuously passed through the air filter medium at a flow velocity of 5.3 cm/s may be 30.0 g/m² or more and is preferably 40.0 or more and more preferably 50.0 or more. Thus, the decrease in collection efficiency of liquid particles can be suppressed for the air filter medium having a sufficient dust-holding capacity of liquid particles.

The thickness of the air filter medium is not limited, and is, for example, 300 μm or more and 1000 μm or less and preferably 400 μm or more and 800 μm or less. The thickness of the air filter medium is a thickness measured when a load of 0.3 N is imposed on a measurement target in a particular measuring instrument.

The specific layer structure of the air filter medium described above is not limited. The following layer structures can be exemplified.

Figure 1:
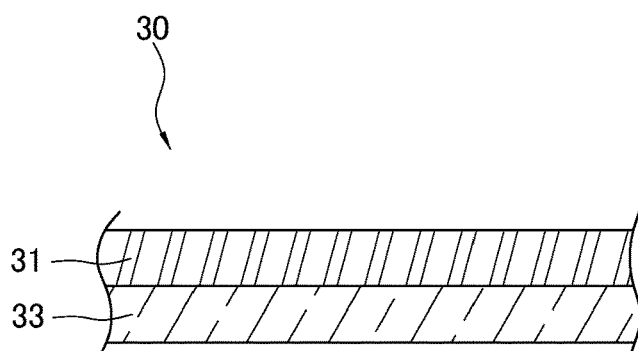
FIG. 1 is a schematic sectional view illustrating a layer structure of an air filter medium (part one).

As in an air filter medium 30 in FIG. 1, the air filter medium may have a structure in which a fluororesin porous film 31 and an air-permeable supporting film 33 are stacked in the air flow direction. The air-permeable supporting film 33 may be disposed on the leeward side with respect to the fluororesin porous film 31, may be disposed on the windward side, or may be disposed on both the leeward side and the windward side.

Figure 2:
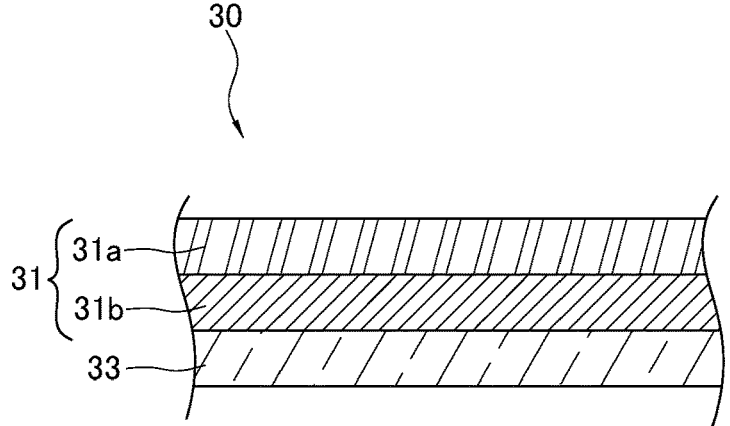
FIG. 2 is a schematic sectional view illustrating a layer structure of an air filter medium (part two).

As in an air filter medium 30 in FIG. 2, the air filter medium may have a structure in which a fluororesin porous film 31 including a first fluororesin porous film 31a and a second fluororesin porous film 31b disposed on the downstream side with respect to the first fluororesin porous film 31a, and an air-permeable supporting film 33 are stacked in the air flow direction. In this case, the air-permeable supporting film 33 may be disposed on the leeward side with respect to the first fluororesin porous film 31a and the second fluororesin porous film 31b, may be disposed on the windward side, or may be disposed on both the leeward side and the windward side. Alternatively, the air-permeable supporting film 33 may be disposed between the first fluororesin porous film 31a and the second fluororesin porous film 31b.

Figure 3:
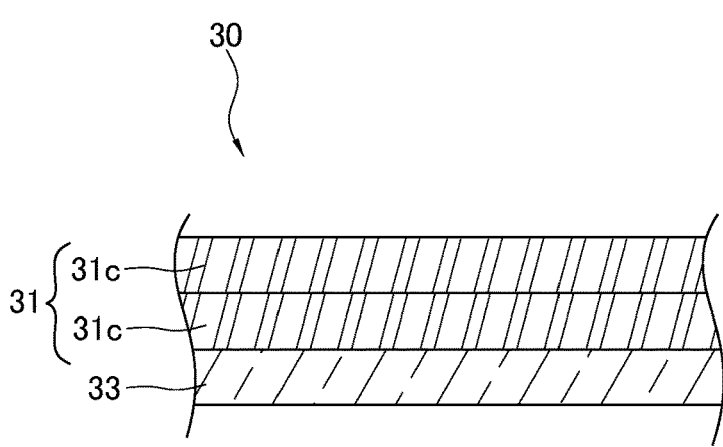
FIG. 3 is a schematic sectional view illustrating a layer structure of an air filter medium (part three).

As in an air filter medium 30 in FIG. 3, the air filter medium may have a structure in which a fluororesin porous film 31 including a plurality of (e.g., two) identical fluororesin porous films 31c and an air-permeable supporting film 33 are stacked in the air flow direction. In this case, the air-permeable supporting film 33 may also be disposed on the leeward side with respect to the plurality of identical fluororesin porous films 31c, may be disposed on the windward side, or may be disposed on both the leeward side and the windward side. Alternatively, the air-permeable supporting film 33 may be disposed between the plurality of identical fluororesin porous films 31c.

Figure 4:
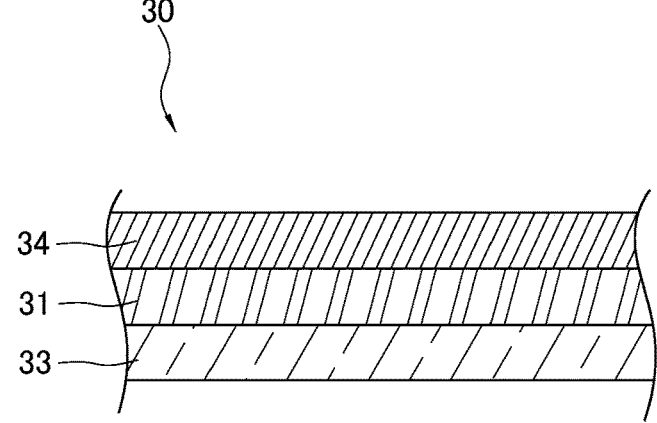
FIG. 4 is a schematic sectional view illustrating a layer structure of an air filter medium (part four).

As in an air filter medium 30 in FIG. 4, the air filter medium may have a structure in which a pre-collection film 34, a fluororesin porous film 31 disposed on the downstream side with respect to the pre-collection film 34, and an air-permeable supporting film 33 are stacked in the air flow direction. In this case, the air-permeable supporting film 33 may also be disposed on the leeward side with respect to the pre-collection film 34 and the fluororesin porous film 31, may be disposed on the windward side, or may be disposed on both the leeward side and the windward side. Alternatively, the air-permeable supporting film 33 may be disposed between the pre-collection film 34 and the fluororesin porous film 31.

Figure 5:
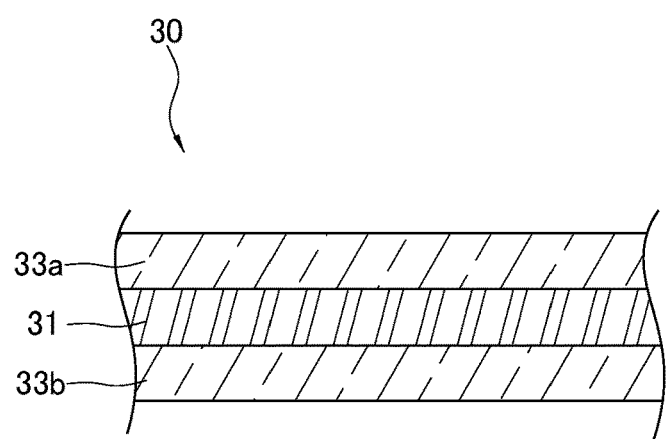
FIG. 5 is a schematic sectional view illustrating a layer structure of an air filter medium (part five).

As in an air filter medium 30 in FIG. 5, the air filter medium may have a structure in which a fluororesin porous film 31, an upstream air-permeable supporting film 33a disposed on the upstream side with respect to the fluororesin porous film 31, and a downstream air-permeable supporting film 33b disposed on the downstream side with respect to the fluororesin porous film 31 are stacked in the air flow direction.

These fluororesin porous films 31 are not limited to being homogeneous in the air flow direction, and may have a density difference in the air flow direction.

The method for stacking these films, layers, and the like is not limited. The films and layers may be bonded to each other by using an anchor effect provided by partial melting through heating or melting of a hot-melt resin, may be bonded to each other by using a reactive adhesive or the like, or may be simply placed on top of each other. The thickness of each film and each layer substantially does not change after the bonding.

Each layer and the relationship between the layers will be exemplified below.

(2) Fluororesin Porous Film

The fluororesin porous film mainly contains a fluororesin and preferably has a porous film structure including fibrils (fibers, not illustrated) and nodes (nodal portions, not illustrated) connected to the fibrils.

Herein, the term "mainly" means that when a plurality of components are contained, the fluororesin has the highest content. The fluororesin porous film may contain, for example, 50 wt % or more of a fluororesin relative to the weight of the fluororesin porous film, preferably contains 80 wt % or more of a fluororesin, and more preferably contains 95 wt % or more of a fluororesin. The fluororesin porous film may be constituted by only a fluororesin. For the content of the fluororesin, the same applies to each of a plurality of identical fluororesin porous films constituting the fluororesin porous film, the first fluororesin porous film, and the second fluororesin porous film.

An example of the components other than the fluororesin is an inorganic filler that is a non-fibril-forming non-melting-processable component (B component) described later.

The fluororesin used for the fluororesin porous film may be formed of one component or two or more components. An example of the fluororesin formed of two or more components is a three-component mixture of a fibril-forming PTFE (hereafter also referred to as an A component), a non-fibril-forming non-melting-processable component (hereafter also referred to as a B component), and a non-fibril-forming melting-processable component (hereafter also referred to as a C component) having a melting point of lower than 320° C. The fluororesin porous film is preferably formed of these three components in a combined manner. The fluororesin porous film formed of these three components has a film structure with a higher porosity and a larger thickness than known fibril-forming PTFE (high-molecular-weight PTFE) porous films. Therefore, fine particles in gas can be collected in a large region in a thickness direction of the filter medium, which can improve the dust-holding capacity. By forming the fluororesin porous film from these three components, the dust-holding capacity of liquid particles can be particularly increased rather than that of solid particles.

Hereafter, the above three components will be described in detail.

(2-1) A Component: Fibril-Forming PTFE

The fibril-forming PTFE is, for example, a high-molecular-weight PTFE obtained through emulsion polymerization or suspension polymerization of tetrafluoroethylene (TFE). The high molecular weight herein is a molecular weight at which fibrillation is easily caused and fibrils having a large fiber length are obtained during drawing in the production of a porous film, the standard specific gravity (SSG) is 2.130 to 2.230, and the melt flow substantially does not occur because of the high melt viscosity. The SSG of the fibril-forming PTFE is preferably 2.130 to 2.190 and more preferably 2.140 to 2.170 from the viewpoint of achieving ease of fibrillation and providing fibrils having a large fiber length. An excessively high SSG may deteriorate the drawability of the mixture of the components A to C. An excessively low SSG deteriorates the rollability and thus deteriorates the uniformity of the porous film, which may increase the pressure loss of the porous film. From the viewpoint of achieving ease of fibrillation and providing fibrils having a large fiber length, a PTFE obtained through emulsion polymerization is preferred. The standard specific gravity (SSG) is measured in conformity to ASTM D 4895.

The presence or absence of fibrillability, that is, whether fibrillation is achieved or not can be judged by checking whether paste extrusion, which is a typical method for molding a high-molecular-weight PTFE powder obtained from a polymer of TFE, can be performed or not. Normally, paste extrusion can be performed because a high-molecular-weight PTFE has fibrillability. In the case where an unbaked molded body obtained through paste extrusion substantially does not have strength or elongation, such as the case where the molded body has an elongation of 0% and is broken when stretched, such a molded body can be considered to have no fibrillability.

The high-molecular-weight PTFE may be a modified polytetrafluoroethylene (hereafter referred to as a modified PTFE), a homo-polytetrafluoroethylene (hereafter referred to as a homo-PTFE), or a mixture of a modified PTFE and a homo-PTFE. Non-limiting examples of the homo-PTFE that can be suitably used include homo-PTFEs disclosed in Japanese Unexamined Patent Application Publication No. 53-60979, Japanese Unexamined Patent Application Publication No. 57-135, Japanese Unexamined Patent Application Publication No. 61-16907, Japanese Unexamined Patent Application Publication No. 62-104816, Japanese Unexamined Patent Application Publication No. 62-190206, Japanese Unexamined Patent Application Publication No. 63-137906, Japanese Unexamined Patent Application Publication No. 2000-143727, Japanese Unexamined Patent Application Publication No. 2002-201217, International Publication No. 2007/046345, International Publication No. 2007/119829, International Publication No. 2009/001894, International Publication No. 2010/113950, and International Publication No. 2013/027850. In particular, homo-PTFEs disclosed in Japanese Unexamined Patent Application Publication No. 57-135, Japanese Unexamined Patent Application Publication No. 63-137906. Japanese Unexamined Patent Application Publication No. 2000-143727, Japanese Unexamined Patent Application Publication No. 2002-201217. International Publication No. 2007/046345. International Publication No. 2007/119829, and International Publication No. 2010/113950 are preferred from the viewpoint of high drawability.

The modified PTFE is constituted by TFE and a monomer other than TFE (hereafter referred to as a modifying monomer). Non-limiting examples of the modified PTFE include PTFEs homogeneously modified by the modifying monomer, PTFEs modified at the beginning of polymerization reaction, and PTFEs modified at the end of polymerization reaction. Examples of the modified PTFE that can be suitably used include modified PTFEs disclosed in Japanese Unexamined Patent Application Publication No. 60-42446, Japanese Unexamined Patent Application Publication No. 61-16907, Japanese Unexamined Patent Application Publication No. 62-104816, Japanese Unexamined Patent Application Publication No. 62-190206, Japanese Unexamined Patent Application Publication No. 64-1711, Japanese Unexamined Patent Application Publication No. 2-261810, Japanese Unexamined Patent Application Publication No. 11-240917, Japanese Unexamined Patent Application Publication No. 11-240918, International Publication No. 2003/033555, International Publication No. 2005/061567, International Publication No. 2007/005361, International Publication No. 2011/055824, and International Publication No. 2013/027850. In particular, modified PTFEs disclosed in Japanese Unexamined Patent Application Publication No. 61-16907, Japanese Unexamined Patent Application Publication No. 62-104816, Japanese Unexamined Patent Application Publication No. 64-1711, Japanese Unexamined Patent Application Publication No. 11-240917, International Publication No. 2003/033555, International Publication No. 2005/061567, International Publication No. 2007/005361, and International Publication No. 2011/055824 are preferred from the viewpoint of high drawability.

The modified PTFE contains a TFE unit based on TFE and a modifying monomer unit based on the modifying monomer. The modifying monomer unit is a moiety in a molecular structure of the modified PTFE, the moiety being derived from the modifying monomer. The content of the modifying monomer unit in all monomer units of the modified PTFE is preferably 0.001 to 0.500 wt % and more preferably 0.01 to 0.30 wt %. The all monomer units are moieties derived from all monomers in a molecular structure of the modified PTFE.

The modifying monomer is not limited as long as the modifying monomer is copolymerizable with TFE. Examples of the modifying monomer include perfluoroolefins such as hexafluoropropylene (HFP); chlorofluoroolefins such as chlorotrifluoroethylene (CTFE); hydrogen-containing fluoroolefins such as trifluoroethylene and vinylidene fluoride (VDF); perfluorovinyl ethers; and (perfluoroalkyl) ethylenes (PFAE) and ethylene. A single modifying monomer may be used or a plurality of modifying monomers may be used.

The perfluorovinyl ethers are not limited. For example, an unsaturated perfluoro compound represented by general formula (1) below can be used.

$$CF_2=CF—ORf \tag{1}$$

In the formula, Rf represents a perfluoro organic group.

In this specification, the perfluoro organic group is an organic group obtained by substituting all hydrogen atoms bonding to carbon atoms with fluorine atoms. The perfluoro organic group may contain ether oxygen.

An example of the perfluorovinyl ether is a perfluoro (alkyl vinyl ether) (PAVE) with Rf representing a perfluoroalkyl group having 1 to 10 carbon atoms in the general formula (1). The perfluoroalkyl group preferably has 1 to 5 carbon atoms. Examples of the perfluoroalkyl group in PAVE include a perfluoromethyl group, a perfluoroethyl group, a perfluoropropyl group, a perfluorobutyl group, a perfluoropentyl group, and a perfluorohexyl group. The PAVE is preferably perfluoro(propyl vinyl ether) (PPVE) or perfluoro(methyl vinyl ether) (PMVE).

The perfluoroalkyl ethylene (PFAE) is not limited, and examples thereof include perfluorobutyl ethylene (PFBE) and perfluorohexyl ethylene (PFHE).

The modifying monomer in the modified PTFE is preferably at least one monomer selected from the group consisting of HFP, CTFE, VDF. PAVE, PFAE, and ethylene.

The content of the homo-PTFE in the fibril-forming PTFE is particularly preferably more than 50 wt % from the viewpoint of achieving ease of fibrillation and providing fibrils having a large fiber length.

The fibril-forming PTFE may contain the above-described components in a combined manner.

The content of the fibril-forming PTFE in the porous film is preferably more than 50 wt % from the viewpoint of maintaining the fibrous structure of the porous film.

(2-2) B Component: Non-Fibril-Forming Non-Melting-Processable Component

The non-fibril-forming non-melting-processable component is mainly unevenly distributed in the nodal portions as non-fibrous particles and has a function of suppressing fibrillation of the fibril-forming PTFE.

Examples of the non-fibril-forming non-melting-processable component include components having thermoplasticity, such as low-molecular-weight PTFEs; thermosetting resins; inorganic fillers; and mixtures of the foregoing.

The component having thermoplasticity preferably has a melting point of 320° C. or higher and has as high a melt viscosity as possible. For example, the low-molecular-weight PTFE has a high melt viscosity and therefore can remain in the nodal portions even when processed at a temperature higher than or equal to the melting point. In this specification, the low-molecular-weight PTFE is a PTFE having a number-average molecular weight of 600,000 or less, a melting point of 320° C. or higher and 335° C. or lower, and a melt viscosity at 380° C. of 100 Pa·s to $7.0 \times 10^5$ Pa·s (refer to Japanese Unexamined Patent Application Publication No. 10-147617).

Examples of the method for producing a low-molecular-weight PTFE include a method in which a high-molecular-weight PTFE powder (molding powder) obtained through suspension polymerization of TFE or a high-molecular-weight PTFE powder (FP: fine powder) obtained through emulsion polymerization of TFE and a particular fluoride are thermally decomposed by causing a catalytic reaction at high temperature (refer to Japanese Unexamined Patent Application Publication No. 61-162503), a method in which the high-molecular-weight PTFE powder or a molded body is irradiated with ionizing radiation (refer to Japanese Unexamined Patent Application Publication No. 48-78252), and a method in which TFE is directly polymerized together with a chain transfer agent (refer to, e.g., International Publication No. 2004/050727, International Publication No. 2009/020187, and International Publication No. 2010/114033). The low-molecular-weight PTFE may be a homo-PTFE or the above-described modified PTFE containing a modifying monomer as in the case of the fibril-forming PTFE.

The low-molecular-weight PTFE has no fibrillability. The presence or absence of fibrillability can be judged by the above-described method. For the low-molecular-weight PTFE, an unbaked molded body obtained through paste extrusion substantially does not have strength or elongation, such as an elongation of 0%, and is broken when stretched.

The low-molecular-weight PTFE is not limited, but preferably has a melt viscosity at 380° C. of 1000 Pa·s or more, more preferably 5000 Pa·s or more, and further preferably 10000 Pa·s or more. At a high melt viscosity, even if the non-fibril-forming melting-processable component serving as a C component is melted during production of the porous film, the non-fibril-forming non-melting-processable component can remain in the nodal portions, which can suppress the fibrillation.

Examples of the thermosetting resin include epoxy resin, silicone resin, polyester resin, polyurethane resin, polyimide resin, phenolic resin, and mixtures of the foregoing resins. The thermosetting resin is desirably an uncured resin dispersed in water from the viewpoint of workability of co-coagulation described later. Each of these thermosetting resins is commercially available.

Examples of the inorganic filler include talc, mica, calcium silicate, glass fiber, calcium carbonate, magnesium carbonate, carbon fiber, barium sulfate, calcium sulfate, and mixtures of the foregoing. In particular, talc is preferably used from the viewpoint of specific gravity and affinity for a fibril-forming high-molecular-weight PTFE. The inorganic filler preferably has a particle size of 3 μm or more and 20 μm or less from the viewpoint of formation of a stable dispersion body during production of the porous film. The particle size is an average particle size measured by a laser diffraction/scattering method. Each of these inorganic fillers is commercially available.

The non-fibril-forming non-melting-processable component may contain the above-described components in a combined manner.

The content of the non-fibril-forming non-melting-processable component in the porous film is preferably 1 wt % or more and 50 wt % or less. When the content of the non-fibril-forming non-melting-processable component is 50 wt % or less, the fibrous structure of the porous film is easily maintained. The content of the non-fibril-forming non-melting-processable component is preferably 20 wt % or more and 40 wt % or less and more preferably 30 wt %. When the content is 20 wt % or more and 40 wt % or less, the fibrillation of the fibril-forming PTFE can be more effectively suppressed.

(2-3) C Component: Non-Fibril-Forming Melting-Processable Component Having Melting Point of Lower than 320° C.

The non-fibril-forming melting-processable component having a melting point of lower than 320° C. (hereafter also referred to as a non-fibril-forming melting-processable component) has flowability when melted. Therefore, the non-fibril-forming melting-processable component can be melted during production (drawing) of the porous film and cured in the nodal portions. This increases the strength of the whole porous film and thus can suppress the deterioration of filter performance even if the porous film is compressed, for example, in the downstream processes.

The non-fibril-forming melting-processable component preferably has a melt viscosity of less than 10000 Pa·s at 380° C. The melting point of the non-fibril-forming melting-processable component is a temperature at a peak top of a heat-of-fusion curve obtained when the component is heated to a temperature higher than or equal to the melting point at a temperature-increasing rate of 10° C./min to be completely melted once, cooled to a temperature lower than or equal to the melting point at 10° C./min. and then heated again at 10° C./min using a differential scanning calorimeter (DSC).

Examples of the non-fibril-forming melting-processable component include components that sufficiently exhibit meltability and flowability at a drawing temperature during production of the porous film, such as heat-meltable fluoropolymer, polystyrene resin, polyethylene terephthalate (PET), polyester resin, polyamide resin, and mixtures of the foregoing resins. In particular, a heat-meltable fluoropolymer is preferred from the viewpoint of high heat resistance at a drawing temperature during production of the porous film and high chemical resistance. The heat-meltable fluoropolymer is a fluoropolymer having a copolymer unit derived from at least one fluorinated ethylenically unsaturated monomer, preferably two or more fluorinated ethylenically unsaturated monomers, represented by general formula (2) below.

$$RCF{=}CR_2 \tag{2}$$

(in the formula, each R independently selected from H, F, Cl, alkyl having 1 to 8 carbon atoms, aryl having 6 to 8 carbon atoms, cyclic alkyl having 3 to 10 carbon atoms, and perfluoroalkyl having 1 to 8 carbon atoms. In this case, all R may be the same, any two R may be the same and the remaining one R may be different from the two R, or all R may be different from each other.)

Non-limiting useful examples of the compound represented by the general formula (2) include perfluoroolefins such as fluoroethylene, VDF, trifluoroethylene. TFE, and HFP; chlorofluoroolefins such as CTFE and dichlorodifluoroethylene; (perfluoroalkyl)ethylenes such as PFBE and PFHE; perfluoro-1,3-dioxole; and mixtures of the foregoing.

The fluoropolymer may also include a copolymer derived from copolymerization of at least one monomer represented by the general formula (2) and at least one copolymerizable comonomer represented by the above general formula (1) and/or general formula (3) below.

$$R_2C{=}CR_2 \tag{3}$$

(In the formula, each R independently selected from H, Cl, an alkyl group having 1 to 8 carbon atoms, an aryl group having 6 to 8 carbon atoms, and a cyclic alkyl group having 3 to 10 carbon atoms. In this case, all R may be the same, any two or more R may be the same and the remaining R may be different from the two or more R, or all R may be different from each other. If the remaining R are plural R, the plural R may be different from each other.)

A useful example of the compound represented by the general formula (1) is a perfluoro(alkyl vinyl ether) (PAVE). The PAVE is preferably perfluoro(propyl vinyl ether) (PPVE) or perfluoro(methyl vinyl ether) (PMVE).

Useful examples of the compound represented by the general formula (3) include ethylene and propylene.

More specific examples of the fluoropolymer include polyfluoroethylene derived from polymerization of fluoroethylene, polyvinylidene fluoride (PVDF) derived from polymerization of vinylidene fluoride (VDF), polychlorotrifluoroethylene (PCTFE) derived from polymerization of chlorotrifluoroethylene (CTFE), a fluoropolymer derived from copolymerization of two or more different monomers represented by the general formula (2), and a fluoropolymer derived from copolymerization of at least one monomer represented by the general formula (2) and at least one monomer represented by the general formula (1) and/or at least one monomer represented by the general formula (3).

Examples of the fluoropolymer include polymers having a copolymer unit derived from VDF and hexafluoropropylene (HFP) and polymers derived from TFE and at least one copolymerizable comonomer (at least 3 wt %) other than TFE. Examples of the latter fluoropolymer include TFE/PAVE copolymers (PFA), TFE/PAVE/CTFE copolymers. TFE/HFP copolymers (FEP), TFE/ethylene copolymers (ETFE), TFE/HFP/ethylene copolymers (EFEP), TFE/VDF copolymers, TFE/VDF/HFP copolymers, TFE/VDF/CTFE copolymers, and mixtures of the foregoing copolymers.

The non-fibril-forming melting-processable component may contain the above-described components in a combined manner.

The content of the non-fibril-forming melting-processable component in the porous film is preferably 0.1 wt % or more and less than 20 wt %. When the content is less than 20 wt %, the non-fibril-forming melting-processable component is dispersed in portions other than the nodal portions in the porous film, which suppresses an increase in the pressure loss of the porous film. Furthermore, when the content is less than 20 wt %, drawing is easily performed at a high area drawing ratio of 40 times or more, which will be described later. When the content of the non-fibril-forming melting-processable component in the porous film is 0.1 wt % or more, the deterioration of filter performance of the porous film is sufficiently suppressed even if a compressive force or the like is exerted in the downstream processes. The content of the non-fibril-forming melting-processable component in the porous film is preferably 15 wt % or less and more preferably 10 wt % or less. The content of the non-fibril-forming melting-processable component in the porous film is preferably 0.5 wt % or more from the viewpoint of ensuring the strength of the porous film. The content is particularly preferably about 5 wt %.

The content of the non-fibril-forming melting-processable component is preferably 10 wt % or less to satisfactorily perform drawing at an area drawing ratio of 40 times or more and 800 times or less.

In the porous film formed of the above-described three components, the fibrils are mainly formed of the A component and the nodal portions are formed of the A to C components. Such nodal portions are formed in the porous film so as to have a relatively large size, which allows molding of a thick porous film. The nodal portions contain the non-fibril-forming melting-processable component and thus are relatively hard, and serve as pillars that support the porous film in the thickness direction. Therefore, the deterioration of filter performance of the porous film can be suppressed even if a compressive force or the like is exerted in the thickness direction in the downstream processes such as stacking of air-permeable supporting films and pleating described later.

(2-4) Other Properties of Fluororesin Porous Film

When the air filter medium has a single fluororesin porous film, a portion of the fluororesin porous film with a filling factor of 3.5% or less may have a thickness of 45 μm or more, the portion with a filling factor of 3.5% or less may have a thickness of 50 μm or more, the portion with a filling factor of 3.5% or less may have a thickness of 100 μm or more, or the portion with a filling factor of 3.5% or less may have a thickness of 150 μm or more. For the fluororesin porous film, a portion with a filling factor of 2.5% or less may have a thickness of 50 μm or more, the portion with a filling factor of 2.5% or less may have a thickness of 100 μm or more, or the portion with a filling factor of 2.5% or less may have a thickness of 150 μm or more. For the fluororesin porous film, a portion with a filling factor of 2.0% or less may have a thickness of 50 μm or more, the portion with a filling factor of 2.0% or less may have a thickness of 100 μm or more, or the portion with a filling factor of 2.0% or less may have a thickness of 150 μm or more. The filling factor of the single fluororesin porous film is not limited, but is preferably, for example, 0.5% or more and may be 1.0% or more.

The single fluororesin porous film may contain a modified polytetrafluoroethylene, and preferably contains a modified polytetrafluoroethylene and a homo-polytetrafluoroethylene. Examples of the modified polytetrafluoroethylene include a copolymer of tetrafluoroethylene and perfluoroalkyl vinyl ether, a copolymer of tetrafluoroethylene and hexafluoropropylene, a copolymer of tetrafluoroethylene and perfluoropropyl vinyl ether, a copolymer of tetrafluoroethylene and trifluorochloroethylene, and mixtures of the foregoing. The content of the modified polytetrafluoroethylene in the fluororesin porous film is preferably 10 wt % or more and 98 wt % or less and more preferably 50 wt % or more and 95 wt % or less from the viewpoint of favorably maintaining the moldability of polytetrafluoroethylene.

The filling factor of the single porous fluororesin film may be substantially uniform in the thickness direction or may change in the thickness direction. The fluororesin porous film whose filling factor changes in the thickness direction is preferably a fluororesin porous film in which the filling factor of a portion on the windward side is lower than that of a portion on the leeward side (gradient density porous film). When the filling factor of the single fluororesin porous film is different between on the windward side and on the leeward side, for example, the ratio of dust-holding capacity of PAO particles on the windward side/dust-holding capacity of PAO particles on the leeward side may be 1.2 or more and 5.0 or less and is preferably 1.5 or more and 3.0 or less. The dust-holding capacity of PAO particles on the windward side is preferably 35.0 g/m$^2$ or more and 70.0 g/m$^2$ or less, and the dust-holding capacity of PAO particles on the leeward side is 10.0 g/m$^2$ or more and less than 35.0 g/m$^2$.

The thickness of the single fluororesin porous film is not limited, and may be 45 μm or more, 50 μm or more, 100 μm or more, or 150 μm or more. When the thickness is less than 45 μm, leakage is likely to occur.

For the single fluororesin porous film, a PF value calculated from the formula PF={–log((100–collection efficiency (%))/100)}/(pressure loss (Pa)/1000) using the pressure loss and collection efficiency determined from polyalphaolefin particles having a particle size of 0.3 μm is preferably 17 or more, more preferably 20 or more, and further preferably 25 or more.

For the single fluororesin porous film, the dust-holding capacity of polyalphaolefin particles having a number median diameter of 0.25 μm at which the pressure loss increases by 250 Pa when air containing the polyalphaolefin particles is continuously passed through the fluororesin porous film at a flow velocity of 5.3 cm/s is preferably 30.0 g/m$^2$ or more, more preferably 50.0 g/m$^2$ or more, and further preferably 90.0 g/m$^2$ or more.

For the single fluororesin porous film, the pressure loss at which air is passed through the fluororesin porous film at a flow velocity of 5.3 cm/s is preferably 200 Pa or less and more preferably 185 Pa or less.

The mean flow pore size of the single fluororesin porous film is preferably 2.5 μm or more and more preferably 4.0 μm or more.

When the fluororesin porous film of the air filter medium includes a plurality of fluororesin porous films such as a first fluororesin porous film and a second fluororesin porous film, a portion of the first fluororesin porous film disposed on the most windward side with a filling factor of 3.5% or less may have a thickness of 45 μm or more, the portion with a filling factor of 3.5% or less may have a thickness of 50 μm or more, the portion with a filling factor of 3.5% or less may have a thickness of 100 μm or more, or the portion with a filling factor of 3.5% or less may have a thickness of 150 μm or more. For the first fluororesin porous film, a portion with a filling factor of 2.5% or less may have a thickness of 50 μm or more, the portion with a filling factor of 2.5% or less may have a thickness of 100 μm or more, or the portion with a filling factor of 2.5% or less may have a thickness of 150 μm or more. For the first fluororesin porous film, a portion with a filling factor of 2.0% or less may have a thickness of 50 μm or more, the portion with a filling factor of 2.0% or less may have a thickness of 100 μm or more, or the portion with a filling factor of 2.0% or less may have a thickness of 150 μm or more. The filling factor of the first fluororesin porous film is not limited, but is preferably, for example, 0.5% or more and may be 1.0% or more.

The first fluororesin porous film may contain a modified polytetrafluoroethylene, and preferably contains a modified polytetrafluoroethylene and a homo-polytetrafluoroethylene. Examples of the modified polytetrafluoroethylene include a copolymer of tetrafluoroethylene and perfluoroalkyl vinyl ether, a copolymer of tetrafluoroethylene and hexafluoropropylene, a copolymer of tetrafluoroethylene and perfluoropropyl vinyl ether, a copolymer of tetrafluoroethylene and trifluorochloroethylene, and mixtures of the foregoing. The content of the modified polytetrafluoroethylene in the fluororesin porous film is preferably 10 wt % or more and 98 wt % or less and more preferably 50 wt % or more and 95 wt % or less from the viewpoint of favorably maintaining the moldability of polytetrafluoroethylene.

The thickness of the first fluororesin porous film is not limited, and may be 45 μm or more, 50 μm or more, 100 μm or more, or 150 μm or more. When the first fluororesin porous film has a thickness of less than 45 μm, the dust collection load applied to the second fluororesin porous film disposed on the downstream side excessively increases, which tends to cause clogging in the second fluororesin porous film at an early stage.

For the first fluororesin porous film, a PF value calculated from the formula PF={-log((100–collection efficiency (%))/100)}/(pressure loss (Pa)/1000) using the pressure loss and collection efficiency determined from polyalphaolefin particles having a particle size of 0.3 μm is preferably 17 or more, more preferably 20 or more, and further preferably 25 or more.

For the first fluororesin porous film, the dust-holding capacity of polyalphaolefin particles having a number median diameter of 0.25 μm at which the pressure loss increases by 250 Pa when air containing the polyalphaolefin particles is continuously passed through the fluororesin porous film at a flow velocity of 5.3 cm/s is preferably 30.0 g/m$^2$ or more, more preferably 50.0 g/m$^2$ or more, and further preferably 90.0 g/m$^2$ or more.

For the first fluororesin porous film the pressure loss at which air is passed through the fluororesin porous film at a flow velocity of 5.3 cm/s is preferably 200 Pa or less and more preferably 185 Pa or less.

The mean flow pore size of the first fluororesin porous film is preferably 3.5 μm or more and more preferably 4.0 μm or more.

The second fluororesin porous film disposed on the downstream side of an air flow with respect to the first fluororesin porous film may be the same as the first fluororesin porous film, but preferably has a higher filling factor than the first fluororesin porous film from the viewpoint of increasing the dust-holding capacity of the entire air filter medium.

For example, the thickness of the second fluororesin porous film is preferably smaller than that of the first fluororesin porous film, and may be 5 μm or more and is preferably 40 μm or more. The thickness of the second fluororesin porous film may be, for example, 100 μm or less.

(2-5) Method for Producing Fluororesin Porous Film

Next, a method for producing an air filter medium will be described by taking examples.

In the production of the fluororesin porous film, a fluororesin can be used. For example, the fluororesin is preferably formed of the three components described above.

The form of the three components A to C described above is not limited, and is, for example, a composition, a mixed powder, or a molding material described later. A composition, a mixed powder, or a molding material serving as a raw material for the porous film will be described.

The composition, the mixed powder, and the molding material each contain the above-described A component, B component, and C component and each contain the C component, for example, in an amount of 0.1 wt % or more and less than 20 wt % relative to the total amount. The A component, the B component, and the C component respectively correspond to the fibril-forming PTFE, the non-fibril-forming non-melting-processable component, and the non-fibril-forming melting-processable component that have been described in the porous film.

The molding material is, for example, a porous film-molding material for molding a porous film used as a filter medium that collects fine particles in gas.

The form of the raw material for the porous film may be a mixed powder described later or a non-powdery mixture or may be a molding material or a composition described later. The mixed powder is, for example, a fine powder obtained through co-coagulation, a powder obtained by mixing two raw materials out of three through co-coagulation and mixing the remaining component using a mixer, or a powder obtained by mixing three raw materials using a mixer, which are used in Examples below. The non-powdery mixture is, for example, a molded body such as a porous body (e.g., a porous film) or an aqueous dispersion body containing the three components.

The molding material is a material adjusted for processing required to mold a composition, such as a material to which a processing aid (e.g., liquid lubricant) or the like is added, a material whose grain size is adjusted, or a preliminarily molded material. The molding material may contain, for example, a publicly known additive in addition to the above three components. Examples of the publicly known additive include carbon materials such as carbon nanotube and carbon black, pigments, photocatalysts, activated carbon, antibacterial agents, adsorbents, and deodorizers.

The composition can be produced by various methods. For example, when the composition is a mixed powder, the composition can be produced by a method in which a powder of the A component, a powder of the B component, and a powder of the C component are mixed with each other using a typical mixer or the like, a method in which an aqueous dispersion containing the A component, an aqueous dispersion containing the B component, and an aqueous dispersion containing the C component are co-coagulated to obtain a co-coagulated powder, or a method in which a mixed powder obtained by, in advance, co-coagulating an aqueous dispersion containing any two components of the A component, the B component, and the C component is mixed with a powder of the remaining one component using a typical mixer or the like. A suitable drawn material can be produced by any of these methods. In particular, the composition is preferably a composition obtained by co-coagulating an aqueous dispersion containing the A component, an aqueous dispersion containing the B component, and an aqueous dispersion containing the C component from the viewpoint of ease of uniform dispersion of the three different components.

The size of the mixed powder obtained by co-coagulation is not limited, and, for example, the average particle size is 100 μm or more and 1000 μm or less and preferably 300 μm or more and 800 μm or less. In this case, the average particle size is measured in conformity to JIS K6891. The apparent density of the mixed powder obtained by co-coagulation is not limited, and is, for example, 0.40 g/ml or more and 0.60 g/ml or less and preferably 0.45 g/ml or more and 0.55 g/ml or less. The apparent density is measured in conformity to JIS K6892.

The co-coagulation method is, for example, as follows:

(i) a method in which an aqueous dispersion of the A component, an aqueous dispersion of the B component, and an aqueous dispersion of the C component are mixed with each other and then coagulation is performed;

(ii) a method in which an aqueous dispersion containing any one of the A component, the B component, and the C component is mixed with powders of the remaining two components and then coagulation is performed;

(iii) a method in which a powder of any one of the A component, the B component, and the C component is added to a mixed aqueous dispersion containing aqueous dispersions of the remaining two components in a mixed manner and then coagulation is performed; and (iv) a method in which a two-component mixed powder obtained by mixing in advance aqueous dispersions of any two of the A component, the B component, and the C component and then performing coagulation is added to an aqueous dispersion of the remaining one component and then coagulation is performed.

The method (i) is preferred as a co-coagulation method because the three components are easily dispersed in a uniform manner.

In the co-coagulation performed by the methods (i) to (iv), coagulation is preferably performed by adding any of an acid such as nitric acid, hydrochloric acid, or sulfuric acid; a metal salt such as magnesium chloride, calcium chloride, sodium chloride, aluminum sulfate, magnesium sulfate, barium sulfate, sodium hydrogencarbonate, or sodium carbonate: or an organic solvent such as acetone or methanol.

The form of the A component before mixing is not limited, and may be an aqueous dispersion or a powder of the above-described fibril-forming PTFE. Examples of the powder (in particular, the above-described FP: fine powder) include "Teflon 6-J" (Teflon: registered trademark), "Teflon 6C-J", and "Teflon 62-J" manufactured by Du Pont-Mitsui Fluorochemicals Company, Ltd.: "POLYFLON F106" (POLYFLON: registered trademark). "POLYFLON F104", "POLYFLON F201", and "POLYFLON F302" manufactured by DAIKIN INDUSTRIES, Ltd.; "Fluon CD123" (Fluon: registered trademark), "Fluon CDI", "Fluon CD141", and "Fluon CD145" manufactured by AGC Inc.: and "Teflon 60", "Teflon 60 X", "Teflon 601A", "Teflon 601 X", "Teflon 613A", "Teflon 613A X", "Teflon 605XT X", and "Teflon 669 X" manufactured by Du Pont. Alternatively, the fine powder may be obtained by coagulating and drying an aqueous dispersion (an as-polymerized aqueous dispersion) of a fibril-forming PTFE obtained through emulsion polymerization of TFE.

The aqueous dispersion of a fibril-forming PTFE may be the as-polymerized aqueous dispersion or a commercially available aqueous dispersion. A preferred method for producing the as-polymerized aqueous dispersion of a fibril-forming PTFE is a production method disclosed in the above patent documents listed for disclosing homo-PTFEs. Examples of the commercially available aqueous dispersion of a fibril-forming PTFE include aqueous dispersions such as "POLYFLON D-110", "POLYFLON D-210", "POLYFLON D-210C", and "POLYFLON D-310" manufactured by DAIKIN INDUSTRIES, Ltd.; "Teflon 31-JR" and "Teflon 34-JR" manufactured by Du Pont-Mitsui Fluorochemicals Company, Ltd.; and "Fluon AD911L", "Fluon AD912L", and "AD938L" manufactured by AGC Inc. Since any commercially available aqueous dispersion of a fibril-forming PTFE contains 2 to 10 parts by weight of a nonionic surfactant or the like relative to 100 parts by weight of PTFE in the aqueous dispersion in order to maintain stability, the nonionic surfactant tends to remain in a mixed powder obtained by co-coagulation, which may cause a problem such as coloring of a porous body. Thus, the aqueous dispersion of a fibril-forming PTFE is preferably an as-polymerized aqueous dispersion.

The form of the B component before mixing is not limited. When the B component is a low-molecular-weight PTFE, the form of the B component before mixing is not limited, but may be an aqueous dispersion or a powder (generally referred to as a PTFE micropowder or a micropowder). Examples of the powder of the low-molecular-weight PTFE include "MP1300-J" manufactured by Du Pont-Mitsui Fluorochemicals Company, Ltd.; "Lubron L-5" (Lubron: registered trademark) and "Lubron L-5F" manufactured by DAIKIN INDUSTRIES, Ltd.; "Fluon L169J", "Fluon L170J", and "Fluon L172J" manufactured by AGC Inc.; and "KTL-F" and "KTL-500F" manufactured by KITAMURA Limited.

The aqueous dispersion of the low-molecular-weight PTFE may be the as-polymerized aqueous dispersion obtained through emulsion polymerization of TFE or a commercially available aqueous dispersion. Alternatively, an aqueous dispersion prepared by dispersing a micropowder in water using a surfactant or the like may be used. Examples of the preferred method for producing the as-polymerized aqueous dispersion of the fibril-forming PTFE include production methods disclosed in Japanese Unexamined Patent Application Publication No. 7-165828, Japanese Unexamined Patent Application Publication No. 10-147617, Japanese Unexamined Patent Application Publication No. 2006-063140, Japanese Unexamined Patent Application Publication No. 2009-1745, and International Publication No. 2009/020187. An example of the commercially available aqueous dispersion of the fibril-forming PTFE is an aqueous dispersion such as "Lubron LDW-410" manufactured by DAIKIN INDUSTRIES, Ltd. Since commercially available aqueous dispersions of a low-molecular-weight PTFE contain 2 to 10 parts by weight of a nonionic surfactant or the like relative to 100 parts by weight of PTFE in the aqueous dispersion in order to maintain stability, the nonionic surfactant tends to remain in a mixed powder obtained by co-coagulation, which may cause a problem such as coloring of a porous body. Thus, the aqueous dispersion of the low-molecular-weight PTFE is preferably an as-polymerized aqueous dispersion liquid.

When an inorganic filler is used as the B component, the form of the B component before mixing is also not limited, and is preferably an aqueous dispersion body. Examples of the inorganic filler include "Talc P2" manufactured by NIPPON TALC Co., Ltd. and "LMR-100" manufactured by FUJI TALC INDUSTRIAL Co., Ltd. They are used by dispersing a powder in water through, for example, appropriate surface treatment using a silane coupling agent or the like. In particular, a secondary crushed product (e.g., "Talc P2") obtained by using a jet mill is preferably used in terms of dispersibility in water.

Examples of the C component include fluororesins such as FEP and PFA and resins such as acrylic resin, urethane resin, and PET resin. The form of the C component before mixing is not limited, and is preferably an aqueous dispersion body. When a resin obtained through emulsion polymerization is used, the aqueous dispersion body may be an as-polymerized dispersion body or a dispersion body obtained by dispersing a resin powder in water using a surfactant or the like. The aqueous dispersion body is prepared by dispersing the C component in water in a predetermined amount so that the porous film contains 0.1 wt % or more and less than 20 wt % of the C component.

The method of co-coagulation is not limited, and it is preferable to mix three aqueous dispersion bodies and then exert a mechanical stirring force.

After the co-coagulation, dehydration and drying are performed and extrusion is performed using a liquid lubricant (extrusion aid) added. Any liquid lubricant may be used as long as the liquid lubricant can wet the surface of the PTFE powder and is a substance that can be removed after the mixture obtained through co-coagulation is molded into a film. Examples of the liquid lubricant include hydrocarbon oils such as liquid paraffin, naphtha, white oil, toluene, and xylene; alcohols; ketones; and esters.

The mixture obtained through co-coagulation is mixed with a liquid lubricant and then extruded and rolled by a publicly known method to obtain a molded film-like product. The extrusion is performed by, for example, paste extrusion or ram extrusion and preferably by paste extrusion. A sheet-shaped extruded product obtained through paste extrusion is rolled using a calender roll or the like under heating at a temperature of, for example, 40° C. or higher and 80° C. or lower. The thickness of the obtained film-like rolled product is set in accordance with the thickness of the intended porous film and is normally 100 μm or more and 1000 μm or less and may be 100 μm or more and 400 μm or less.

Subsequently, the liquid lubricant is removed from the unbaked film that is the rolled product. The liquid lubricant is removed by a heating method and/or an extracting method. When the three components A to C are used, the heating temperature in the heating method is not limited as long as the heating temperature is lower than the melting point of the non-fibril-forming melting-processable component. The heating temperature is, for example, 100° C. or higher and 250° C. or lower and may be 180° C. or higher and 200° C. or lower.

Herein, the rolled product from which the liquid lubricant has been removed is preferably subjected to heat treatment in an atmosphere at a temperature of 250° C. or higher and 325° C. or lower for 1 minute or longer before drawing from the viewpoint of decreasing the filling factor of the obtained fluororesin porous film and decreasing the pressure loss. The temperature of the heat treatment may be, for example, 320° C. or lower and is preferably lower than the melting point of the fluororesin used for producing the fluororesin porous film. In the case where a plurality of endothermic curves (primary melting point, secondary melting point) appear on a crystal melting curve when the rolled product is heated using a differential scanning calorimeter at a temperature-increasing rate of 10° C./min, the temperature of the heat treatment may be lower than or equal to the lower maximum peak temperature (primary melting point). The temperature of the heat treatment may be, for example, 260° C. or higher or 280° C. or higher, may be a temperature higher than or equal to the temperature at which the liquid lubricant is removed from the unbaked film that is the rolled product by the heating method, or may be a temperature higher than or equal to the drawing temperature (in the case of biaxial drawing, the temperature of primary drawing performed earlier) from the viewpoint of sufficiently decreasing the filling factor and the pressure loss. The duration of the heat treatment is not limited, and may be, for example, 1 minute or longer and 2 hours or shorter or 30 minutes or longer and 1 hour or shorter in accordance with desired effects of the heat treatment.

To obtain a single fluororesin porous film having different filling factors in the thickness direction, the temperature is not limited, but the heat treatment is preferably performed such that the temperature on a portion in which the filling factor is decreased is higher than that on a portion in which the filling factor is increased. The heat treatment is preferably performed such that the temperature of the heat treatment in a portion on the windward side is higher than that in a portion on the leeward side. The portion on the leeward side may be cooled to a temperature lower than the normal temperature. Regarding the temperature of the heat treatment, the difference in temperature between the portion on the windward side and the portion on the leeward side may be 100° C. or higher and is preferably 200° C. or higher and more preferably 300° C. or higher from the viewpoint of generating a sufficient density difference. During the heat treatment, the heat treatment is preferably performed such that the heating time in the portion in which the filling factor is decreased is increased and the heating time in the portion in which the filling factor is increased is decreased. Accordingly, by drawing the obtained rolled product, the filling factor on the windward side can be decreased and the filling factor on the leeward side can be increased.

Thus, the rolled product from which the liquid lubricant has been removed or the rolled product further subjected to heat treatment is drawn. When the non-fibril-forming melting-processable component and the non-fibril-forming non-melting-processable component are contained, the drawing is performed at a temperature that is higher than or equal to the melting point of the non-fibril-forming melting-processable component and that is lower than or equal to the decomposition temperature of the non-fibril-forming non-melting-processable component.

When a non-fibril-forming melting-processable component is used in the production of the fluororesin porous film, the non-fibril-forming melting-processable component melts in the drawing process and subsequently solidifies at the nodal portions, to thereby enable increase of the strength of the porous film in the thickness direction. The drawing temperature at this time may be set in accordance with the temperature of a furnace in which the drawing is performed, or the temperature of a heating roller that conveys the rolled product, or a combination of these temperatures.

The drawing is performed in a first direction and preferably in a second direction orthogonal to the first direction. Herein, the drawing may be performed in the first direction and then in the second direction, or the drawing in the first direction and the drawing in the second direction may be performed at the same time. When the porous film is used for embossed air filter medium, the drawing is also preferably performed in the second direction. In this embodiment, the first direction is a longitudinal direction (machine direction: MD) of the rolled product, and the second direction is a width direction (transverse direction: TD) of the rolled product. The drawing may be performed simultaneously while a plurality of rolled products are stacked.

The rolled product is drawn at an area drawing ratio of 40 times or more and 800 times or less.

From the viewpoint of decreasing the filling factor of the obtained fluororesin porous film and decreasing the pressure loss, the drawing is preferably performed so as to provide a portion drawn at a drawing speed of 30%/s or less in the drawing direction, more preferably performed so as to provide a portion drawn at a drawing speed of 20%/s or less, and further preferably performed so as to provide a portion drawn at a drawing speed of 10%/s or less. In the case of biaxial drawing, it is sufficient that a drawing speed of 30%/s or less is achieved in any of the machine direction and the transverse direction. It is preferable to achieve a drawing speed of 30%/s or less during the preceding drawing in the machine direction. Furthermore, in the case where drawing is simultaneously performed in the machine direction and the transverse direction in a plane using a table test apparatus or the like, it is preferable to achieve a drawing speed of 30%/s or less in any of the machine direction and the transverse direction. The drawing speed can be set to, for example, 1%/s or more regardless of the machine direction and the transverse direction.

The drawing speed is a value obtained by dividing a drawing ratio (%) by the time (second) required for the drawing. The drawing ratio (%) is a ratio of the length after drawing to the length before drawing (length after drawing/length before drawing). In the case where the drawing speed is decreased as described above, the use of the raw materials of the three components is preferred because the pressure loss of the obtained porous film can be further decreased.

From the viewpoint of further decreasing the filling factor of the obtained fluororesin porous film and further decreasing the pressure loss, it is preferable to perform the heat treatment on the rolled product before the drawing and furthermore perform drawing at a low speed as described above.

In the case of biaxial drawing, the temperature during drawing in the first direction is preferably 200° C. or higher and 300° C. or lower and more preferably 230° C. or higher and 250° C. or lower. The temperature during drawing in the second direction is preferably 200° C. or higher and 300° C. or lower and more preferably 230° C. or higher and 250° C. or lower.

When the rolled product (also referred to as an unbaked fluororesin product) is drawn, the temperature, the drawing ratio, and the drawing speed during the drawing are known to affect the physical properties of a drawn product. The S-S curve (a graph illustrating the relationship between tensile force and elongation) of the unbaked fluororesin product shows unique characteristics different from those of other resins. Normally, the tensile force of resin materials increases as the elongation increases. In most cases, for example, the elastic region and the breaking point are dependent on the material and the evaluation conditions whereas the tensile force tends to increase as the elongation increases. In contrast, the unbaked fluororesin product has a tensile force that shows a peak at a particular elongation and then tends to gradually decrease. This shows that unbaked fluororesin products have a "region in which portions not subjected to drawing are stronger than portions subjected to drawing".

When this is applied to the behavior during drawing, in the case of a general resin, the weakest portion in the drawing plane starts to be drawn during drawing, but the drawn portion becomes stronger than the undrawn portion. Therefore, the next weaker undrawn portion is drawn, whereby the drawn region expands and the entire film is drawn. On the other hand, in the case of the unbaked fluororesin product, when the portion that starts to be drawn reaches the "region in which portions not subjected to drawing are stronger than portions subjected to drawing", the portion that has already been drawn is further drawn. As a result, the undrawn portion remains as a node (nodal portion, undrawn portion). As the drawing speed decreases, this phenomenon becomes noticeable and larger nodes (nodal portions or undrawn portions) are left. By using this phenomenon during drawing, the physical properties of a drawn body are adjusted in accordance with various applications.

In this embodiment, a drawn body having a lower density is preferably obtained, and it is effective to apply a low drawing speed particularly to first drawing in the case of biaxial drawing. Herein, when a non-fibril-forming non-melting-processable component is used, the above-described phenomenon due to a low drawing speed becomes more noticeable compared with the case where large nodes (nodal portions or undrawn portions) are left and only known PTFE is used as a raw material. Even when a molded body having a low filling factor is intended to be obtained, the drawing speed can be increased compared with the case where only PTFE is used as a raw material.

The thus-obtained porous film is preferably subjected to heat setting to achieve mechanical strength and dimensional stability. The temperature during the heat setting may be a temperature higher than or equal to the melting point of PTFE or lower than the melting point of PTFE and is preferably 250° C. or higher and 400° C. or lower.

When a second fluororesin porous film having physical properties different from those of the first fluororesin porous film is obtained, the mean flow pore size of the porous film obtained can be decreased by, for example, reducing the amount of the liquid lubricant relative to 100 parts by weight of the fluororesin during the production of the second fluororesin porous film compared with during the production of the first fluororesin porous film. This can provide a second fluororesin porous film having higher pressure loss and higher collection efficiency than the first fluororesin porous film. In this case, the difference in the content of the liquid lubricant relative to 100 parts by weight of the fluororesin (liquid lubricant content difference or aid content difference) is preferably 1 part by weight or more and 4 parts by weight or less. When the aid content difference is 1 part by weight or more, the mean flow pore size can be moderately differentiated between the two porous films. When the aid content difference is 4 parts by weight or less, the deterioration of uniformity of drawing can be suppressed. The uniformity of drawing means that the variation in characteristics such as collection efficiency and pressure loss is small in the porous film produced by performing drawing and such characteristics are uniform on the whole porous film. The liquid lubricant content difference is, for example, 2 parts by weight.

The content of the liquid lubricant used in the production of each of the fluororesin porous films is preferably 30 parts by weight or more and 37 parts by weight or less relative to 100 parts by weight of the fluororesin. When the content is 30 parts by weight or more, the pressure loss can be decreased, which can decrease the pressure loss of the whole filter medium to less than 200 Pa. When the content is 37 parts by weight or less, the moldability of an unbaked film (raw tape) can be ensured. This can suppress an excessively high load on the second fluororesin porous film on the downstream side caused when fine particles pass through the first fluororesin porous film having an excessively increased pore size toward the downstream side without being collected.

In particular, the content of the liquid lubricant used in the production of the first fluororesin porous film is, for example, preferably 34 to 36 parts by weight relative to 100 parts by weight of the fluororesin. For example, the dust-holding capacity of the filter medium can be greatly increased by using 34 to 36 parts by weight of the liquid lubricant for producing the first fluororesin porous film and 31 to 34 parts by weight of the liquid lubricant for producing the second fluororesin porous film while a liquid lubricant content difference of 1 to 4 parts by weight is satisfied.

The differentiation in mean flow pore size between the first fluororesin porous film and the second fluororesin porous film may be achieved by differentiating the mixing ratio of the three components between the two porous films.

(3) Air-Permeable Supporting Film

The air-permeable supporting film is disposed on the upstream side and/or the downstream side with respect to the fluororesin porous film so as to support the fluororesin porous film. Therefore, even if it is difficult to self stand the fluororesin porous film, because of its small thickness or the like, the support of the air-permeable supporting film allows the self stand of the fluororesin porous film. Furthermore, high strength of an air filter medium is achieved, which facilitates handling.

Non-limiting examples of the material and structure of the air-permeable supporting film include nonwoven fabric, woven fabric, metal mesh, and resin net. In particular, a nonwoven fabric having heat fusibility is preferred from the viewpoint of strength, collectability, flexibility, and workability. The nonwoven fabric is preferably a nonwoven fabric in which some or all of constituent fibers have a core/sheath structure, a two-layer nonwoven fabric including a fiber layer formed of a low-melting-point material and a fiber layer formed of a high-melting-point material, or a nonwoven fabric whose surface is coated with a heat fusible resin. Such a nonwoven fabric is, for example, a spun-bonded nonwoven fabric. The nonwoven fabric having a core/sheath structure is preferably a nonwoven fabric in which the core component has a higher melting point than the sheath component. Examples of the combination of materials for the core/sheath include PET/PE and high-melting-point polyester/low-melting-point polyester. Examples of the combination of the low-melting-point material/high-melting-point material for the two-layer nonwoven fabric include PE/PET, PP/PET, PBT/PET, and low-melting-point PET/high-melting-point PET. Examples of the non-woven fabric whose surface is coated with a heat fusible resin include a PET nonwoven fabric whose surface is coated with EVA (ethylene-vinyl acetate copolymer resin) and a PET nonwoven fabric whose surface is coated with an olefin resin.

Non-limiting examples of the material for the nonwoven fabric include polyolefins (e.g., PE and PP), polyamides, polyesters (e.g., PET), aromatic polyamides, and composite materials of the foregoing.

The air-permeable supporting film can be joined to the fluororesin porous film by using an anchor effect due to partial melting of the air-permeable supporting film through heating or due to melting of a hot-melt resin, or by using adhesion of a reactive adhesive or the like.

The air-permeable supporting film has a pressure loss, a collection efficiency, and a dust-holding capacity much lower than those of the above-described fluororesin porous film. The pressure loss, the collection efficiency, and the dust-holding capacity may be values considered to be substantially zero. The pressure loss of the air-permeable supporting film is, for example, preferably 10 Pa or less, more preferably 5 Pa or less, and further preferably 1 Pa or less. The collection efficiency of polyalphaolefin particles having a particle size of 0.3 μm in the air-permeable supporting film may be, for example, a value considered to be substantially zero or about zero. The thickness of the air-permeable supporting film is, for example, preferably 0.3 mm or less and more preferably 0.25 mm or less. The basis weight of the air-permeable supporting film is, for example, preferably 20 $g/m^2$ or more and 50 $g/m^2$ or less.

(4) Pre-Collection Film

The pre-collection film is disposed on the upstream side with respect to the fluororesin porous film and can collect a part of dust in the air flow.

For the pre-collection film, the pressure loss obtained when air is passed through the pre-collection film at a flow velocity of 5.3 cm/s is preferably 5 Pa or more and less than 55 Pa and more preferably 15 Pa or more and less than 45 Pa from the viewpoint of reducing the pressure loss of the whole air filter medium.

The collection efficiency of polyalphaolefin particles having a particle size of 0.3 μm in the pre-collection film is preferably 15% or more and less than 85% and more preferably 30% or more and less than 75%.

The thickness of the pre-collection film is not limited, and may be 100.0 μm or more and is preferably 200.0 μm or more. The upper limit of the thickness of the pre-collection film is preferably 800.0 μm and more preferably 600.0 μm from the viewpoint of ease of a folding process in which the air filter medium is pleated. The thickness of the pre-collection film is preferably larger than the thickness of the fluororesin porous film used together.

The basis weight of the pre-collection film is not limited, and may be, for example, 10 $g/m^2$ or more and 70 $g/m^2$ or less and is preferably 25 $g/m^2$ or more and 50 $g/m^2$ or less.

The first fluororesin porous film disposed on the upstream side with respect to the second fluororesin porous film also has a pre-collection function for the second fluororesin porous film. The first fluororesin porous film can achieve the same level of performance as the pre-collection film with a smaller thickness. In this regard, in the air filter medium including the first fluororesin porous film and the second fluororesin porous film, the pre-collection film may be omitted from the viewpoint of decreasing the thickness.

Such a pre-collection film is not limited and may be a glass fiber filter medium or may be a nonwoven fabric or a fiber layer structural body formed of a fiber material produced by one of a melt-blowing process, an electrospinning process, a sea-island process, and a hybrid process of the foregoing. The hybrid process includes, for example, a melt spinning process or an electret blowing process. The sea-island process is a process in which, for example, when a fiber is produced by performing discharge from a plurality of discharge outlets, different raw materials are used for different discharge paths and part of the raw materials constitute a sea portion and the other raw materials constitute island portions so that the cross-section of the fiber has a sea-island structure. Herein, two polymers or a plurality of polymers for sea and islands are spun and the polymer for sea is melted in the later process to leave the island portions, thereby producing a fiber. The combination of the different raw materials for different discharge paths allows adjustment of, for example, bulk density and stretchability. In the melt-blowing process, yarn is formed by discharging a molten polymer from a nozzle using an extruder while blowing heated air along the nozzle. By adjusting, for example, the amount of polymer discharged from the nozzle per unit time and the blowing rate of heated air, a yarn having a smaller diameter can be obtained. The physical properties of the yarn can also be changed by adjusting the melt viscosity of a polymer used. Examples of the material used when the pre-collection film is produced by one of a melt-blowing process, an electrospinning process, a sea-island process, and a hybrid process of the foregoing include polyethylene (PE), polypropylene (PP), polyethylene terephthalate (PET), polybutylene terephthalate (PBT), polyamide (PA), polyacrylonitrile (PAN), polyvinylidene fluoride (PVdF), polyvinyl alcohol (PVA), poly urethane (PU), and mixtures of the foregoing.

The pre-collection film is used together with the fluororesin porous film. To suppress formation of holes in the fluororesin porous film caused by generation of sparks due to static electricity, the pre-collection film is preferably constituted by a glass fiber filter medium, which is a material does not easily charge. A glass fiber filter medium having the above physical properties may be produced, or a commercially available glass fiber filter medium may be obtained.

(5) Examples of Applications

The air filter medium is used, for example, in the following applications:

fields of, for example, ULPA filters (ultra low penetration air filters) (for producing semiconductors), HEPA filters (for hospitals and for producing semiconductors), cylindrical cartridge filters (for industrial use), bag filters (for industrial use), heat-resistant bag filters (for treating exhaust gas), heat-resistant pleated filters (for treating exhaust gas), SINBRAN (registered trademark) filters (for industrial use), catalyst filters (for treating exhaust gas), adsorbent-including filters (for installation in HDD), adsorbent-including vent filters (for installation in HDD), vent filters (e.g., for installation in HDD), filters for vacuum cleaners (for vacuum cleaners), general-purpose multilayered felt materials, cartridge filters for gas turbines (interchangeable components for gas turbines), and cooling filters (for casings of electronic devices);

fields of materials for freeze-drying such as freeze-drying bottles, automobile ventilation materials for electronic circuits and lamps, container applications such as container caps, protective ventilation for electronic devices, and ventilation/internal pressure regulation such as medical ventilation; and liquid filtration fields of, for example, semiconductor liquid filtration filters (for producing semiconductors), hydrophilic filters (for producing semiconductors), filters for chemicals (for treating chemical solutions), filters for pure water production lines (for producing pure water), and backwash liquid filtration filters (for treating industrial wastewater).

Even if the collection target is droplet particles, the air filter medium may be used in a medical clean room or in a clean room of a pharmaceutical factory in which droplet particles such as oil mist are included in the collection target from the viewpoint of suppressing a decrease in collection efficiency during use.

(6) Filter Pack

Next, a filter pack according to this embodiment will be described with reference to FIG. 6.

Figure 6:
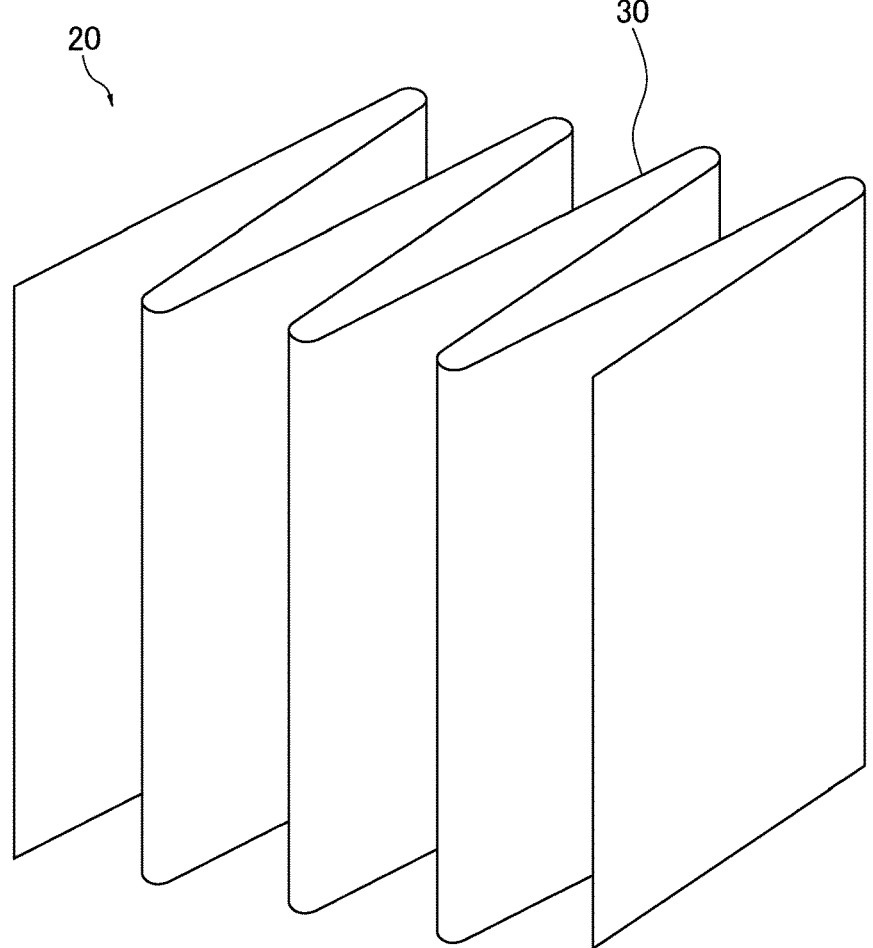
FIG. 6 is an external perspective view of a filter pack.

FIG. 6 is an external perspective view of a filter pack 20 according to this embodiment.

The filter pack 20 includes the above-described air filter medium (e.g., the air filter medium 30). The air filter medium of the filter pack 20 is a filter medium that has been processed so as to have a zigzag shape in which mountain folds and valley folds are alternately repeated (pleating). The pleating can be performed using, for example, a rotary folding machine. The folding width of the filter medium is not limited, and is, for example, 25 mm or more and 280 mm or less. By performing pleating, the folding area of the filter medium can be increased in the case where the filter pack 20 is used for an air filter unit. Thus, an air filter unit having high collection efficiency can be obtained.

In the pleated filter pack, the interval between the tops of adjacent mountain folds or between the bottoms of adjacent valley folds is, for example, 5 to 10 mm. The number of pleats (the number of mountain folds or valley folds) is preferably 10 to 20 per 100 mm of the width of the filter pack (the length in a direction orthogonal to each mountain fold line or each valley fold line).

The filter pack 20 may further include, in addition to the filter medium, spacers (not illustrated) for keeping pleat spacing when used for an air filter unit. The material for the spacers is not limited, and is preferably a hot melt resin, a corrugated aluminum separator, or the like. The air filter medium 30 may have a plurality of embossed protrusions, and the pleat spacing may be kept by the embossed protrusions.

(7) Air Filter Unit

Next, an air filter unit 1 will be described with reference to FIG. 7.

Figure 7:
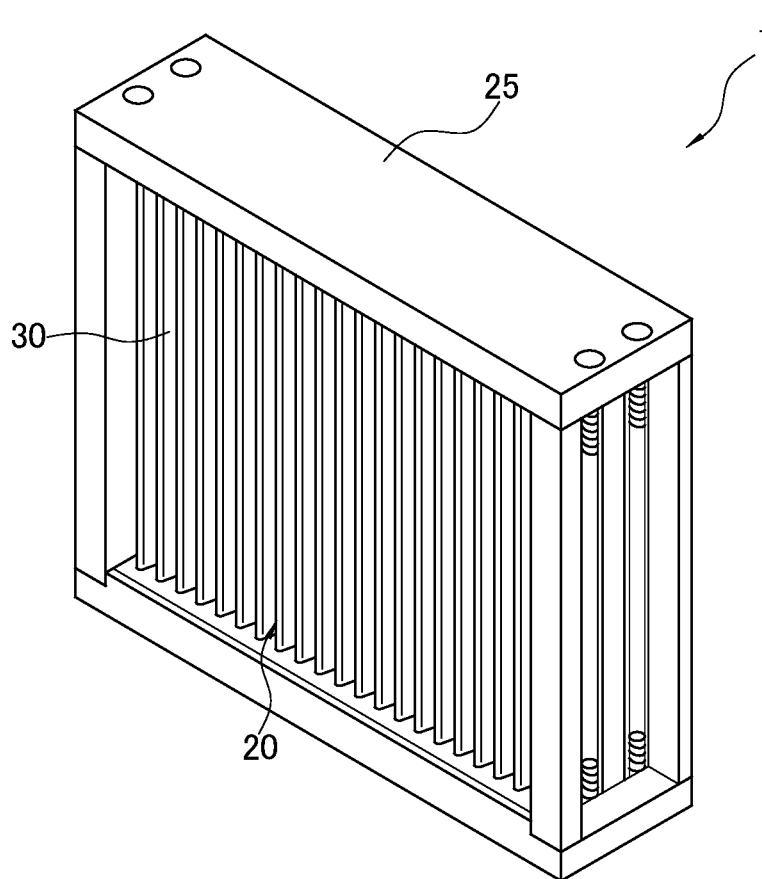
FIG. 7 is an external perspective view of an air filter unit.

FIG. 7 is an external perspective view of an air filter unit 1 according to this embodiment.

The air filter unit 1 includes the above-described air filter medium or filter pack and a frame body 25 that holds the air filter medium or the filter pack. In other words, the air filter unit may be produced such that a filter medium not subjected to mountain folding or valley folding is held by the frame body or such that the filter pack 20 is held by the frame body 25. The air filter unit 1 illustrated in FIG. 7 is produced using the filter pack 20 and the frame body 25.

The frame body 25 is produced by, for example, assembling boards or molding a resin, and the filter pack 20 and the frame body 25 are preferably sealed with each other using a sealer. The sealer is used to prevent leakage between the filter pack 20 and the frame body 25 and is formed of, for example, a resin such as an epoxy resin, an acrylic resin, or a urethane resin.

The air filter unit 1 including the filter pack 20 and the frame body 25 may be a mini-pleat air filter unit in which a single filter pack 20 extending in a flat-plate form is held so as to be accommodated inside the frame body 25 or may be a V-bank air filter unit or a single header air filter unit in which a plurality of filter packs extending in a flat-plate form are arranged and held in the frame body.

Figure 8:
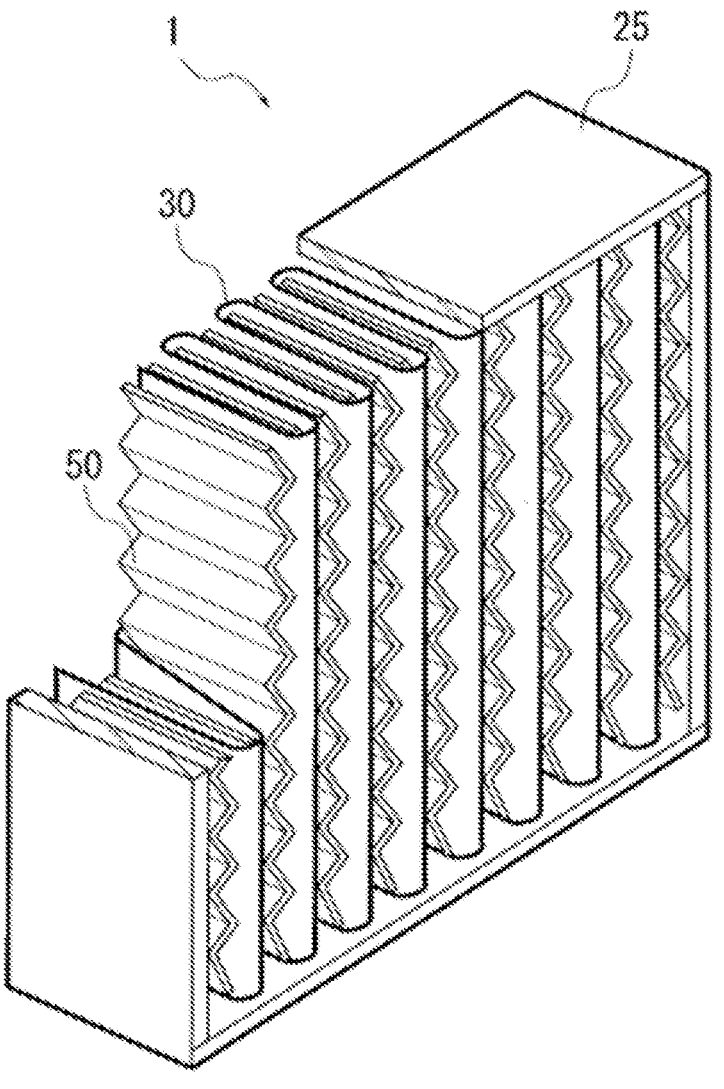
FIG. 8 is an external perspective view of an air filter unit with a separator.

The air filter unit 1 including the filter pack 20 and the frame body 25 may be a separator air filter unit 1 in which as illustrated in FIG. 8, the air filter medium 30 is alternately folded back to form a waveshape and, for example, a corrugated separator 50 is disposed in valley portions of the air filter medium 30 that has been alternately folded back. According to the air filter unit 1, the spacing between pleats of the air filter medium 30 that has been alternately folded back into a waveshape is more stably maintained by the separator 50 even during use.

EXAMPLES

Hereafter, the present disclosure will be specifically described based on Examples and Comparative Examples.

Examples 1 to 4

An air filter medium having a structure illustrated in FIG. 5 was provided as an air filter medium in each of Examples 1 to 4. Specifically, the air filter medium included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were each a spun-bonded nonwoven fabric (average fiber diameter 24 μm, basis weight 40 g/m$^2$, thickness 0.2 mm) formed of fibers having a core/sheath structure in which PET was used for the core and PE was used for the sheath (the collection efficiency could be considered to be substantially zero or about zero). In Examples 1 to 4, heat treatment before drawing was not performed. In Examples 1 to 4, each air filter medium was produced using the same FP raw material while the drawing speed was changed in the MD direction with the same drawing ratio.

The FP raw material used in Examples 1 to 4 was obtained by mixing a mixed powder constituted by three components (fibril-forming PTFE (A component), non-fibril-forming non-melting-processable component (B component), and non-fibril-forming melting-processable component (C component) having a melting point of lower than 320° C.) with an extrusion aid (liquid lubricant) in an amount of 32.0 wt % relative to the mixed powder.

More specifically, 66.5 wt % (in terms of polymer) of a PTFE aqueous dispersion body (A component) having an SSG of 2.160 and prepared by the method described in Comparative Example 3 in International Publication No. 2005/061567, 28.5 wt % (in terms of polymer) of a low-molecular-weight PTFE aqueous dispersion body (B component) having a melt viscosity of 20000 Pa·s as measured by a flow tester method at 380° C. and prepared by the method described in International Publication No. 2009/020187, and 5 wt % (in terms of polymer) of an FEP aqueous dispersion body (C component) having a melting point of 215° C. and prepared by the method described in Japanese Unexamined Patent Application Publication No. 2010-235667 were mixed with each other. As a coagulant, 500 ml of a 1% aqueous aluminum nitrate solution was added thereto, and stirring was performed to cause co-coagulation. The resulting powder was strained through a strainer to remove water and then further dried in a hot-air drying furnace at 135° C. for 18 hours to obtain a mixed powder of the above three components.

Subsequently, 32.0 parts by weight of a hydrocarbon oil ("IP Solvent 2028" manufactured by Idemitsu Kosan Co., Ltd.) serving as an extrusion liquid lubricant was added to and mixed with 100 parts by weight of the mixture at 20° C. Then, the resulting mixture was extruded using a paste extruder equipped with a sheet die to obtain a sheet-shaped molded body. The sheet-shaped molded body was molded into a film using a calender roll heated to 70° C. to obtain a PTFE film. The resulting film was passed through a hot-air drying furnace at 250° C. to evaporate and remove the hydrocarbon oil, thereby obtaining a belt-shaped unbaked PTFE film having an average thickness of 300 μm and an average width of 175 mm. Subsequently, the unbaked PTFE film was drawn in the longitudinal direction at a predetermined drawing ratio and drawing speed in each of Examples. The drawing temperature was 250° C. Subsequently, the drawn unbaked film was drawn in the width direction at a predetermined drawing ratio and drawing speed in each of Examples using a tenter capable of clipping the film, and heat setting was performed. The drawing temperature at this time was 250° C. Thus, a porous film was obtained.

Examples 5 to 9

As illustrated in FIG. 5, each of the air filter media in Examples 5 to 9 also included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. In each of Examples 5 to 9, the unbaked film obtained by removing the extrusion liquid lubricant was subjected to heat treatment (in an environment at 320° C. for 1.0 hour) before drawing. In Examples 5 to 7, each air filter medium was produced using the same FP raw material while the drawing speed was changed in the MD direction with the same drawing ratio. In Examples 7 to 9, each air filter medium was produced using the same FP raw material while only the drawing ratio in the MD direction was changed with the same drawing ratio in the TD direction and the same drawing speed in the MD and TD directions.

In Examples 5 to 9, conditions not particularly specified were the same as those in Example 1.

Examples 10 and 11

As illustrated in FIG. 5, each of the air filter media in Examples 10 and 11 also included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. In Examples 10 and 11, heat treatment before drawing was not performed. In Examples 10 and 11, the air filter media were produced by using different FP raw materials with the same drawing ratio and the same drawing speed in the MD and TD directions. Specifically, the FP raw material in Example 10 was prepared by mixing a mixed powder obtained by co-coagulation of a fine powder (manufactured by DAIKIN INDUSTRIES, Ltd., product name: F302) of a perfluoroalkyl vinyl ether-modified polytetrafluoroethylene which is a copolymer of tetrafluoroethylene and perfluoroalkyl vinyl ether and a fine powder (manufactured by DAIKIN INDUSTRIES, Ltd. trade name: F106) of polytetrafluoroethylene having an average molecular weight of 6,500,000 at a weight ratio of 75:25, with an extrusion aid (liquid lubricant) in an amount of 28 wt % relative to the mixed powder. The FP raw material in Example 11 was prepared by mixing a mixed powder obtained by co-coagulation of a fine powder (manufactured by DAIKIN INDUSTRIES, Ltd., product name: F302) of a perfluoroalkyl vinyl ether-modified polytetrafluoroethylene and a fine powder (manufactured by DAIKIN INDUSTRIES, Ltd. trade name: F106) of polytetrafluoroethylene having an average molecular weight of 6,500,000 at a weight ratio of 90:10, with an extrusion aid (liquid lubricant) in an amount of 28 wt % relative to the mixed powder.

In Examples 10 and 11, conditions not particularly specified were the same as those in Example 1.

Comparative Example 1 and Example 12

The air filter media in Comparative Example 1 and Example 12 were produced by further disposing an upstream air-permeable supporting film on the most upstream side of the air filter medium illustrated in FIG. 2. Specifically, the air filter medium included an upstream air-permeable supporting film, a first fluororesin porous film disposed on the downstream side with respect to the upstream air-permeable supporting film, a second fluororesin porous film disposed on the downstream side with respect to the first fluororesin porous film, and a downstream air-permeable supporting film disposed on the downstream side with respect to the second fluororesin porous film. The upstream air-permeable supporting film and the downstream air-permeable supporting film were the same as those used in Examples 1 to 4. In Comparative Example 1 and Example 12, heat treatment before drawing was not performed. In Comparative Example 1 and Example 12, the drawing ratio was the same.

In Comparative Example 1, an unbaked film serving as the first fluororesin porous film and formed of an FP raw material prepared by mixing a mixed powder constituted by the above three components with an extrusion aid (liquid lubricant) in an amount of 31.5 wt % relative to the mixed powder, and an unbaked film serving as the second fluororesin porous film and formed of an FP raw material prepared by mixing a mixed powder constituted by the above three components with an extrusion aid (liquid lubricant) in an amount of 33.0 wt % relative to the mixed powder were stacked and drawn in the MD direction at a drawing temperature of 300° C. and a drawing speed of 40.2%/s and in the TD direction at a drawing temperature of 290° C., a drawing speed of 114.5%/s, and a heat-setting temperature of 390° C. using a tenter capable of performing continuous clipping.

In Example 12, an unbaked film serving as the first fluororesin porous film and formed of an FP raw material prepared by mixing a mixed powder constituted by the above three components with an extrusion aid (liquid lubricant) in an amount of 32.5 wt % relative to the mixed powder, and an unbaked film serving as the second fluororesin porous film and formed of an FP raw material prepared by mixing a fine powder (manufactured by DAIKIN INDUSTRIES, Ltd., product name: F302) of a perfluoroalkyl vinyl ether-modified polytetrafluoroethylene with an extrusion aid (liquid lubricant) in an amount of 27.0 wt % relative to the mixed powder were stacked and drawn in the MD direction at a drawing temperature of 300° C. and a drawing speed of 40.2%/s and in the TD direction at a drawing temperature of 290° C., a drawing speed of 114.5%/s, and a heat-setting temperature of 390° C. using a tenter capable of performing continuous clipping.

Examples 13 to 15 and Comparative Example 2

As illustrated in FIG. 5, each of the air filter media in Examples 13 to 15 and Comparative Example 2 also included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. In Examples 13 to 15 and Comparative Example 2, heat treatment before drawing was not performed. In Examples 13 and 14 and Comparative Example 2, the drawing ratio was the same. In Examples 13 to 15 and Comparative Example 2, the air filter media were produced by using different FP raw materials.

In Example 13, a mixture of a fine powder (manufactured by DAIKIN INDUSTRIES, Ltd., product name: F302) of a perfluoroalkyl vinyl ether-modified polytetrafluoroethylene and an extrusion aid (liquid lubricant) in an amount of 27.0 wt % relative to the powder was used as the FP raw material. The drawing speed in the MD direction was set to 57.1%/s and the drawing speed in the TD direction was set to 57.1%/s.

In Comparative Example 2, a mixture of a fine powder (manufactured by DAIKIN INDUSTRIES, Ltd., trade name: F106) of polytetrafluoroethylene having an average molecular weight of 6,500,000 and an extrusion aid (liquid lubricant) in an amount of 32.5 wt % relative to the fine powder was used as the FP raw material. The drawing speed in the MD direction was set to 57.1%/s and the drawing speed in the TD direction was set to 57.1%/s.

In Example 14, a mixture of a mixed powder constituted by the above three components and an extrusion aid (liquid lubricant) in an amount of 32.5 wt % relative to the mixed powder was used as the FP raw material. The drawing speed in the MD direction was set to 57.1%/s and the drawing speed in the TD direction was set to 57.1%/s.

In Example 15, a mixture of a fine powder (manufactured by DAIKIN INDUSTRIES, Ltd., product name: F302) of a perfluoroalkyl vinyl ether-modified polytetrafluoroethylene and an extrusion aid (liquid lubricant) in an amount of 25 wt % relative to the powder was used as the FP raw material. The drawing speed in the MD direction was set to 142.9%/s and the drawing speed in the TD direction was set to 142.9%/s.

In Examples 13 to 15 and Comparative Example 2, conditions not particularly specified were the same as those in Example 1.

Examples 16 to 18

The air filter medium in Example 16 was produced by further disposing an upstream air-permeable supporting film on the most upstream side of the air filter medium illustrated in FIG. 3. Specifically, the air filter medium included an upstream air-permeable supporting film, a first fluororesin porous film disposed on the downstream side with respect to the upstream air-permeable supporting film, a second fluororesin porous film disposed on the downstream side with respect to the first fluororesin porous film and having the same physical properties as the first fluororesin porous film, and a downstream air-permeable supporting film disposed on the downstream side with respect to the second fluororesin porous film. The upstream air-permeable supporting film and the downstream air-permeable supporting film were the same as those used in Examples 1 to 4. The air filter medium in Example 17 was produced by further disposing an upstream air-permeable supporting film on the most upstream side of the air filter medium illustrated in FIG. 2.

Specifically, the air filter medium included an upstream air-permeable supporting film, a first fluororesin porous film disposed on the downstream side with respect to the upstream air-permeable supporting film, a second fluororesin porous film disposed on the downstream side with respect to the first fluororesin porous film and having physical properties different from those of the first fluororesin porous film, and a downstream air-permeable supporting film disposed on the downstream side with respect to the second fluororesin porous film. The upstream air-permeable supporting film and the downstream air-permeable supporting film were the same as those used in Examples 1 to 4. As illustrated in FIG. 5, the air filter medium in Example 18 included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. In Examples 16 to 18, heat treatment before drawing was not performed. In Examples 16 to 18, the drawing ratio was the same. In Examples 16 to 18, the air filter media were produced by using different FP raw materials.

In Example 16, two unbaked films serving as the first fluororesin porous film and formed of an FP raw material prepared by mixing a fine powder (manufactured by DAIKIN INDUSTRIES, Ltd., product name: F302) of a perfluoroalkyl vinyl ether-modified polytetrafluoroethylene with an extrusion aid (liquid lubricant) in an amount of 25 wt % relative to the powder were stacked and drawn in the MD direction at a drawing temperature of 250° C. and a drawing speed of 142.9%/s and in the TD direction at a drawing temperature of 250° C. and a drawing speed of 142.9%/s. The second fluororesin porous film was the same as the first fluororesin porous film.

In Example 17, an unbaked film serving as the first fluororesin porous film and formed of an FP raw material prepared by mixing a fine powder (manufactured by DAIKIN INDUSTRIES, Ltd., product name: F302) of a perfluoroalkyl vinyl ether-modified polytetrafluoroethylene with an extrusion aid (liquid lubricant) in an amount of 25.0 wt % relative to the mixed powder, and an unbaked film serving as the second fluororesin porous film and formed of an FP raw material prepared by mixing a mixed powder constituted by the above three components with an extrusion aid (liquid lubricant) in an amount of 30.0 wt % relative to the mixed powder were stacked and drawn in the MD direction at a drawing temperature of 250° C. and a drawing speed of 142.9%/s and in the TD direction at a drawing temperature of 250° C. and a drawing speed of 142.9%/s.

In Example 18, a mixture of a fine powder (manufactured by DAIKIN INDUSTRIES, Ltd., product name: F302) of a perfluoroalkyl vinyl ether-modified polytetrafluoroethylene and an extrusion aid (liquid lubricant) in an amount of 25.0 wt % of the powder was used as the FP raw material. The drawing speed in the MD direction was set to 142.9%/s and the drawing speed in the TD direction was set to 142.9%/s.

In Examples 16 to 18, conditions not particularly specified were the same as those in Example 1.

Example 19

As illustrated in FIG. 4, the air filter medium in Example 19 included a pre-collection film, a fluororesin porous film disposed on the downstream side with respect to the pre-collection film, and an air-permeable supporting film disposed on the downstream side with respect to the fluororesin porous film. The air-permeable supporting film was the same as that used in Examples 1 to 4.

In Example 19, for the fluororesin porous film, an unbaked film was formed of an FP raw material prepared by mixing a mixed powder constituted by the above three components with an extrusion aid (liquid lubricant) in an amount of 32 wt % relative to the mixed powder and obtained by removing the extrusion liquid lubricant. The unbaked film was subjected to heat treatment (in an environment at 320° C. for 1.0 hour) before drawing. In the drawing after the heat treatment, the drawing speed in the MD direction was set to 42.9%/s, and the drawing speed in the TD direction was set to 142.9%/s. The pre-collection film used was a melt-blown nonwoven fabric (basis weight: 33.00 g/m², thickness: 270.0 μm, filling factor: 13.00%, average fiber diameter: 2.1 μm) formed of PP and having a dust-holding capacity of 28.8 g/m² at which the pressure loss increased by 250 Pa when polyalphaolefin particles having a number median diameter of 0.25 μm were passed through the pre-collection film.

In Example 19, conditions not particularly specified were the same as those in Example 1.

Example 20

As illustrated in FIG. 5, the air filter medium in Example 20 included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. The fluororesin porous film in Example 20 was a gradient density porous film having a low filling factor on the windward side and a high filling factor on the leeward side. In this gradient density porous film, a mixture of a mixed powder constituted by the above three components and an extrusion aid (liquid lubricant) in an amount of 32 wt % relative to the mixed powder was used as the FP raw material. The unbaked film that was a rolled product which had a thickness of 600 μm and from which the extrusion aid had been removed by evaporation was subjected to heat treatment from one side for 2 minutes in which the film was heated to 320° C. using a hot plate disposed on the windward side and cooled to 3° C. using a coolant disposed on the leeward side, and then drawn (as in Example 1, the drawing temperature was 250° C. on both the windward side and the leeward side). The dust-holding capacity on the upstream side was measured on a surface heated to 320° C. using a hot plate disposed on the windward side, and the dust-holding capacity on the downstream side was measured on a surface cooled to 3° C. using a coolant disposed on the leeward side.

In Example 20, conditions not particularly specified were the same as those in Example 1.

Example 21

As illustrated in FIG. 5, the air filter medium in Example 21 included one fluororesin porous film, an upstream air-permeable supporting film disposed on the upstream side with respect to the fluororesin porous film, and a downstream air-permeable supporting film disposed on the downstream side with respect to the fluororesin porous film. The upstream air-permeable supporting film and the downstream air-permeable supporting film were the same as those used in Examples 1 to 4. In Example 21, heat treatment before drawing was not performed.

In Example 21, the FP raw material was the same as that in Example 10. A mixture of the same mixed powder obtained by co-coagulation as in Example 10 and an extrusion aid (liquid lubricant) in an amount of 23 wt % relative to the mixed powder was used. In Example 21, the resulting mixture was extruded using a paste extruder equipped with a sheet die to obtain a sheet-shaped molded body. The sheet-shaped molded body was molded into a film using a calender roll heated to 70° C. to obtain a PTFE film. The resulting film was passed through a hot-air drying furnace at 250° C. to evaporate and remove the hydrocarbon oil, thereby obtaining a belt-shaped unbaked PTFE film having an average thickness of 600 μm and an average width of 170 mm. Subsequently, the unbaked PTFE film was longitudinally drawn in the MD direction at a drawing temperature of 250° C. and a drawing speed of 28.7%/s using a heated three-roll drawing apparatus, then drawn in the width direction at a drawing temperature of 300° C. and a drawing speed of 88%/s using a tenter continuous drawing apparatus capable of performing continuous clipping, and further subjected to heat setting at 390° C. Thus, an air filter medium in Example 21 was obtained.

The physical properties measured in Examples and Comparative Examples are as follows.

(Basis Weight of Fluororesin Porous Film)

The basis weight was calculated by dividing the mass (g) of a rectangular cut sample having a size of 4.0 cm×12.0 cm, which was measured with a precision balance, by the area (0.0048 m²).

(Thickness of Fluororesin Porous Film)

The film thickness of one layer was determined by stacking five layers to be measured, measuring the total thickness of the five layers using a thickness meter (ID-110MH, manufactured by Mitutoyo Corporation), and dividing the total thickness by 5.

(Filling Factor of Fluororesin Porous Film)

The filling factor of the porous film was determined from the following formula.

$$\text{Filling factor (\%)} = (\text{basis weight of filter medium}) / \\ (\text{thickness of filter medium}) / (\text{specific gravity of} \\ \text{raw material}) \times 100$$

(Pore Size of Fluororesin Porous Film)

The mean flow pore size measured in conformity to ASTM F316-86 was defined as a pore size (average channel diameter) of the porous film. The actual measurement was performed using a Coulter Porometer (manufactured by Coulter Electronics (UK)).

(Pressure Loss)

The measurement sample of the air filter medium was set to a filter holder having a diameter of 100 mm. The pressure on the inlet side was increased using a compressor, and the flow velocity of air that passed through the air filter medium was adjusted to 5.3 cm/s using a velocimeter. The pressure loss at this time was measured using a manometer.

(Dust-Holding Capacity of Polyalphaolefin Particles: PHC)

The dust-holding capacity was evaluated by a pressure loss-increase test in which polyalphaolefin (PAO) particles (liquid particles) were passed through the filter medium. That is, the pressure loss caused when air containing PAO particles was continuously passed through a sample filter medium having an effective filtration area of 50 cm² at a flow velocity of 5.3 cm/s was measured over time using a differential pressure gauge (U-shaped manometer) to determine a dust-holding capacity (g/m$^2$) that was a weight of PAO particles held in the filter medium per unit area of the filter medium when the pressure loss increased by 250 Pa. The PAO particles were PAO particles (number median diameter: 0.25 µm) generated with a Laskin nozzle, and the concentration of the PAO particles was set to about 1,000,000 to 6,000,000/cm$^3$.

HEPA filter media have no definition of dust-holding capacity, and the initial pressure loss of a filter is generally about 250 Pa or less for HEPA units. The recommended timing at which the filter needs to be replaced is generally a timing at which the pressure loss reaches more than twice the initial pressure loss of the filter. The initial pressure loss of typical HEPA glass filter medium is about 250 to 300 Pa. Therefore, the above test for evaluating the dust-holding capacity of the air filter medium was ended when the pressure loss increased by 250 Pa.

(PF of Polyalphaolefin Particles Having Particle Size of 0.3 µm)

With polyalphaolefin particles having a particle size of 0.3 µm, the PF value was determined from the following formula using the pressure loss and collection efficiency (the collection efficiency of polyalphaolefin particles having a particle size of 0.3 µm) of the filter medium.

$$PF=\{-\log((100-\text{collection efficiency (\%)})/100)\}/(\text{pressure loss (Pa)}/1000)$$

(Collection Efficiency of Polyalphaolefin (PAO) Particles (Liquid Particles) Having Particle Size of 0.3 µm)

The collection efficiency was evaluated based on a pressure loss-increase test by passing polyalphaolefin (PAO) particles (liquid particles) through the filter medium. When air containing PAO particles was continuously passed through a sample filter medium having an effective filtration area of 50 cm$^2$ at a flow velocity of 5.3 cm/s, the collection efficiency was calculated from the formula $(1-C_2)/C_1\times100$, where $C_1$ represents an upstream concentration and $C_2$ represents a downstream concentration. The PAO particles were PAO particles (number median diameter: 0.3 µm) generated with a Laskin nozzle, and the concentration of the PAO particles was set to about 1,000,000 to 6,000,000/cm$^3$.

Tables below show the physical properties of the fluororesin porous film, the first fluororesin porous film, and the second fluororesin porous film and the whole air filter medium (before producing a filter pack or an air filter unit) including such films in each of Examples and Comparative Examples. Herein, "basis weight". "thickness", "filling factor", and "pore size" in Tables indicate the physical properties relating only to "fluororesin porous film", "first fluororesin porous film", and "second fluororesin porous film", and "pressure loss", "PHC", "PF", and "collection efficiency" indicate the physical properties relating to an air filter medium further including an air-permeable supporting film in an integrated manner.

TABLE 1

|  | Example 1 | Example 2 | Example 3 | Example 4 |
|---|---|---|---|---|
| FP (aid) | Three-component mixture (32 P) | | | |
| MD (mm/s) | 1 | 3 | 30 | 100 |
| MD (%/s) | 1.4 | 4.3 | 42.9 | 142.9 |
| TD (mm/s) | 100 | 100 | 100 | 100 |
| MD ratio and TD ratio | MD ratio 7.14 TD ratio 7.14 | MD ratio 7.14 TD ratio 7.14 | MD ratio 7.14 TD ratio 7.14 | MD ratio 7.14 TD ratio 7.14 |
| Basis weight (g/m$^2$) | 7.47 | 7.74 | 8.76 | 8.65 |
| Thickness (µm) | 2.04.0 | 198.7 | 179.3 | 157.3 |
| Filling factor (%) | 1.67 | 1.77 | 2.22 | 2.50 |
| Pore size (µm) | 7.43 | 5.76 | 4.82 | 3.42 |
| Pressure loss (Pa) | 117 | 135 | 167 | 203 |
| PHC (g/m$^2$) @250 Pa | 124.1 | 63.6 | 27.5 | 18.8 |
| PF value (—) | 31.3 | 34.1 | 40.4 | 34.7 |
| Collection efficiency (%) @0.3 µmPAO | 99.978228 | 99.997508 | 99.999982 | 99.999991 |

TABLE 2

|  | Example 5 | Example 6 | Example 7 | Example 8 | Example 9 |
|---|---|---|---|---|---|
| FP (aid) | Three-component mixture (32 P) | | | | |
| MD (mm/s) | 10 | 20 | 30 | 30 | 30 |
| MD (%/s) | 14.3 | 28.6 | 42.9 | 42.9 | 42.9 |
| TD (mm/s) | 100 | 100 | 100 | 100 | 100 |
| MD ratio and TD ratio | MD ratio 7.14 TD ratio 7.14 | MD ratio 7.14 TD ratio 7.14 | MD ratio 7.14 TD ratio 7.14 | MD ratio 28.57 TD ratio 7.14 | MD ratio 51.02 TD ratio 7.14 |
| Basis weight (g/m$^2$) | 9.47 | 9.72 | 10.06 | 1.97 | 1.64 |
| Thickness (µm) | 280.3 | 274.3 | 243.3 | 98.3 | 65.5 |
| Filling factor (%) | 1.54 | 1.61 | 1.88 | 0.91 | 1.14 |
| Pore size (µm) | 15.99 | 11.65 | 11.61 | 9.90 | 12.40 |
| Pressure loss (Pa) | 49 | 63 | 74 | 38 | 26 |
| PHC (g/m$^2$) @250 Pa | 170.5 | 96.1 | 53.2 | 122.7 | 92.8 |
| PF value (—) | 43.7 | 46.0 | 44.3 | 50.5 | 56.0 |
| Collection efficiency (%) @0.3 µmPAO | 99.277725 | 99.873526 | 99.947297 | 98.794970 | 96.500687 |

TABLE 3

| | Example 10 | Example 11 |
|---|---|---|
| FP (aid) | F302:F106 = 75:25 (28 P) | F302:F106 = 90:10 (28 P) |
| MD (mm/s) | 100 | 100 |
| MD (%/s) | 142.9 | 142.9 |
| TD (mm/s) | 100 | 100 |
| MD ratio and TD ratio | MD ratio 7.14 TD ratio 7.14 | MD ratio 7.14 TD ratio 7.14 |
| Basis weight (g/m$^2$) | 11.14 | 14.73 |
| Thickness (μm) | 303.3 | 225.3 |
| Filling factor (%) | 1.67 | 2.97 |
| Pore size (μm) | 4.36 | 7.35 |
| Pressure loss (Pa) | 128 | 80 |
| PHC (g/m$^2$) @250 Pa | 116.6 | 178.6 |
| PF value (—) | 34.6 | 33.2 |
| Collection efficiency (%) @0.3 μmPAO | 99.996299 | 99.779661 |

TABLE 4

| | | Comparative Example 1 | Example 12 |
|---|---|---|---|
| First fluororesin porous film (upstream side) | FP (aid) | Three-component mixture (31.5 P) Three-component mixture (33 P) | Three-component mixture (32.5 P) F302 (27 P) |
| | MD (mm/s) | 105 | 105 |
| | MD (%/s) | 40.2 | 40.2 |
| | TD (mm/s) | 7.75 | 7.75 |
| | MD ratio | MD ratio 5.2 | MD ratio 5.2 |
| | TD ratio | TD ratio 17.1 | TD ratio 17.1 |
| | Basis weight (g/m$^2$) | 8.03 | 7.72 |
| | Thickness (μm) | 79.4 | 100.2 |
| | Filling factor (%) | 4.60 | 3.50 |
| | Pore size (μm) | 1.83 | 2.78 |
| Second fluororesin porous film (downstream side) | Basis weight (g/m$^2$) | 5.73 | 4.26 |
| | Thickness (μm) | 62.0 | 65.1 |
| | Filling factor (%) | 4.20 | 4.00 |
| | Pore size (μm) | 5.22 | 3.84 |
| Pressure loss (Pa) | | 139 | 91 |
| PHC (g/m$^2$) @2.50 Pa | | 20.8 | 97.9 |
| PF value (—) | | 32.3 | 35.1 |
| Collection efficiency (%) @0.3 μmPAO | | 99.996793 | 99.966000 |

TABLE 5

| | Example 13 | Comparative Example 2 | Example 14 | Example 15 |
|---|---|---|---|---|
| FP (aid) | F302(27 P) | F106(32.5 P) | Three-component mixture (32.5 P) | F302(25 P) |
| MD (mm/s) | 40 | 40 | 40 | 1.00 |
| MD (%/s) | 57.1 | 57.1 | 57.1 | 142.9 |
| TD (mm/s) | 40 | 40 | 40 | 100 |
| MD ratio | MD ratio 8 | MD ratio 8 | MD ratio 8 | MD ratio 7.14 |
| TD ratio | TD ratio 11 | TD ratio 11 | TD ratio 11 | TD ratio 3.6 |
| Basis weight (g/m$^2$) | 4.83 | 4.52 | 6.30 | 8.87 |
| Thickness (μm) | 158.7 | 46.3 | 111.3 | 175.7 |
| Filling factor (%) | 1.38 | 4.44 | 2.57 | 2.29 |
| Pore size (μm) | 3.04 | 0.31 | 2.36 | 8.46 |
| Pressure loss (Pa) | 137 | 349 | 183 | 140 |
| PHC (g/m$^2$) @250 Pa | 50.6 | 3.5 | 17.7 | 113.4 |
| PF value (—) | 37.2 | 24.0 | 38.6 | 17.8 |
| Collection efficiency (%) @0.3 μmPAO | 99.999193 | 99.999999 | 99.999991 | 99.680636 |

TABLE 6

| | | Example 16 | Example 17 | Example 18 |
|---|---|---|---|---|
| First fluororesin porous film (upstream side) | FP (aid) | F302(25 P) F302(25 P) (two-film stack) | F302(25 P) Three-component mixture (SOP) | F302(25 P) |
| | MD (mm/s) | 100 | 100 | 100 |
| | MD (%/s) | 142.9 | 142.9 | 142.9 |
| | TD (mm/s) | 100 | 100 | 100 |
| | MD ratio | MD ratio 7.14 | MD ratio 7.14 | MD ratio 7.14 |
| | TD ratio | TD ratio 7.14 | TD ratio 7.14 | TD ratio 7.14 |
| | Basis weight (g/m²) | 7.68 | 4.55 | 4.37 |
| | Thickness (μm) | 85.5 | 96.2 | 92.2 |
| | Filling factor (%) | 2.04 | 2.15 | 2.15 |
| | Pore size (μm) | 2.57 | 6.55 | 6.84 |
| Second fluororesin porous film (downstream side) | Basis weight (g/m²) | 7.68 | 9.24 | |
| | Thickness (μm) | 85.5 | 105.3 | |
| | Filling factor (%) | 2.04 | 3.99 | |
| | Pore size (μm) | 2.57 | 3.13 | |
| Pressure loss (Pa) | | 175 | 163 | 70 |
| PHC (g/m²) @250 Pa | | 126.5 | 131.3 | 101.2 |
| PF value (—) | | 42.7 | 21.0 | 26.2 |
| Collection efficiency (%) @0.3 μmPAO | | 99.999997 | 99.961528 | 98.526012 |

TABLE 7

| | | Example 19 |
|---|---|---|
| Pre-collection film | Basis weight (g/m²) | 33.00 |
| | Thickness (μm) | 270.0 |
| | Filling factor (%) | 13.00 |
| Fluororesin porous film | FP (aid) | Three-component mixture (32 P) heated at 320° C. |
| | VID (mm/s) | 30 |
| | VID (%/s) | 42.9 |
| | FD (mm/s) | 100 |
| | MD ratio | MD ratio 7.14 |
| | TD ratio | TD ratio 7.14 |
| | Basis weight (g/m²) | 1.97 |
| | Thickness (μm) | 257.0 |
| | Filling factor (%) | 1.67 |
| | Pore size (μm) | 11.61 |
| Pressure loss (Pa) | | 90 |
| PHC (g/m²) @250 Pa | | 121.3 |
| PF value (—) | | 24.8 |
| Collection efficiency (%) @0.3 μmPAO | | 99.415250 |

TABLE 8

| | | Example 2.0 |
|---|---|---|
| Fluororesin porous film | FP (aid) | Three-component mixture (32 P) For 600 μm, surface on upstream side was heated to 320° C. and surface on downstream side was cooled to 3° C. |
| | MD (mm/s) | 10 |
| | MD (%/s) | 14.3 |
| | TD (mm/s) | 100 |
| | MD ratio | MD ratio 7.14 |
| | TD ratio | TD ratio 7.14 |
| | Basis weight (g/m²) | 19.13 |
| | Thickness (μm) | 386.0 |
| | Filling factor (%) | 2.25 |
| | Pore size (μm) | 2.39 |

TABLE 8-continued

| | Example 2.0 |
|---|---|
| Pressure loss (Pa) | 195 |
| PHC (g/m²) @250 Pa | Upstream side: 51.0/ Downstream side: 26.0 |
| PF value (—) | 28.6 |
| Collection efficiency (%) @0.3 μmPAO | 99.999731 |

TABLE 9

| | | Example 2.1 |
|---|---|---|
| Fluororesin porous film | FP (aid) | F302:F106 = 75:25(23 P) |
| | MD (mm/s) | 75 |
| | MD (%/s) | 28.7 |
| | TD (mm/s) | 13.1 |
| | MD ratio | MD ratio 10.0 |
| | TD ratio | TD ratio 20.0 |
| | Basis weight (g/m²) | 7.70 |
| | Thickness (μm) | 227.0 |
| | Filling factor (%) | 1.54 |
| | Pore size (μm) | 3.01 |
| Pressure loss (Pa) | | 97 |
| PHC (g/m²) @250 Pa | | 67.5 |
| PF value (—) | | 41.3 |
| Collection efficiency (%) @0.3 μmPAO | | 99.991890 |

(Air Filter Unit)

An air filter unit illustrated in FIG. 8 was produced as follows using the air filter medium in Example 21.

The air filter medium in Example 21 described above was subjected to pleating so as to have mountain folds and valley folds at intervals of 260 mm by a rotary folding machine, thereby producing a processed filter medium having a zigzag shape. Subsequently, separators obtained by corrugating an aluminum plate were inserted between the pleats of the filter medium from both the leeward side and the windward side to obtain a filter pack having 590 mm in length×590 mm in width. The number of pleats was 80. The obtained filter pack was fixed to an aluminum frame body having outer dimensions of 610 mm×610 mm (length×width), inner dimensions of 580 mm×580 mm (length×width), and a depth of 290 mm. The periphery of the filter pack was bonded and sealed to the frame body using a urethane adhesive to obtain a separator air filter unit illustrated in FIG. 8.

The pressure loss and the collection efficiency of the air filter unit obtained as described above were measured as follows.

(Pressure Loss of Air Filter Unit)

The air filter unit was set in a rectangular duct, and the air flow was adjusted so as to have a flow rate of 56 m³/min. The pressure was measured on the upstream side and the downstream side of the air filter unit using a manometer, and the difference between the pressure on the upstream side and the pressure on the downstream side was measured as the pressure loss of the air filter unit.

(Collection Efficiency of Air Filter Unit)

As in the measurement of the pressure loss of the air filter unit, the air filter unit was set to a rectangular duct, and the air flow was adjusted so as to have a flow rate of 56 m³/min. PAO particles having a diameter of 0.3 μm were introduced from the upstream side of the air filter unit. The concentration of the PAO particles on the upstream side and the downstream side of the air filter unit was measured using a light scattering particle counter. The collection efficiency of the air filter unit was determined from the same formula as that for the collection efficiency of the filter medium.

According to the above measurement, the air filter unit produced by using the air filter medium in Example 21 had a pressure loss of 177 Pa and a collection efficiency of 99.9995%.

The embodiments of the present disclosure have been described, but it should be understood that configurations and details can be modified in various ways without departing from the spirit and scope of the present disclosure as defined in the claims.

REFERENCE SIGNS LIST

1 Air filter unit
20 Filter pack
25 Frame body
30 Air filter medium
31 Fluororesin porous film
31*a* First fluororesin porous film (Fluororesin porous film)
31*b* Second fluororesin porous film (Fluororesin porous film)
33 Air-permeable supporting film
34 Pre-collection film

CITATION LIST

Patent Literature

PTL 1: Japanese Unexamined Patent Application Publication No. 2001-170461

The invention claimed is:

1. An air filter medium comprising:
a fluororesin porous film having a portion with a filling factor of 3.5% or less and with an average pore diameter of 4.82 μm or more and 15.99 μm or less,
wherein the portion with the filling factor of 3.5% or less and with the average pore diameter of 4.82 μm or more and 15.99 μm or less has a thickness of 150 μm or more and 386.0 μm or less.

2. The air filter medium according to claim 1,
wherein the fluororesin porous film has a portion with a filling factor of 2.5% or less, and the portion with a filling factor of 2.5% or less has a thickness of 50 μm or more and 380.0 μm or less.

3. The air filter medium according to claim 1,
wherein a PF value of the air filter medium calculated from formula PF={−log((100−collection efficiency (%))/100)}/(pressure loss (Pa)/1000) using pressure loss and collection efficiency determined from polyalphaolefin particles having a particle size of 0.3 μm is 17 or more.

4. The air filter medium according to claim 1, wherein a dust-holding capacity of polyalphaolefin particles having a number median diameter of 0.25 μm at which pressure loss increases by 250 Pa when air containing the polyalphaolefin particles is continuously passed through the air filter medium at a flow velocity of 5.3 cm/s is 30.0 g/m² or more.

5. The air filter medium according to claim 1, having a pressure loss of 200 Pa or less when air is passed through the air filter medium at a flow velocity of 5.3 cm/s.

6. The air filter medium according to claim 1,
wherein the fluororesin porous film includes:
a first fluororesin porous film having a filling factor of 3.5% or less and a thickness of 45 μm or more and 100.2 μm or less, and
a second fluororesin porous film disposed on a downstream side of an air flow with respect to the first fluororesin porous film and having a higher filling factor than the first fluororesin porous film.

7. The air filter medium according to claim 1,
wherein the fluororesin porous film includes at least one gradient density porous film having a higher density on a downstream side of an air flow than on an upstream side of the air flow.

8. The air filter medium according to claim 1,
wherein the fluororesin porous film is a single film.

9. The air filter medium according to claim 1, further comprising:
a pre-collection film disposed on an upstream side of an air flow with respect to the fluororesin porous film,
wherein the pre-collection film has a pressure loss of 15 Pa or more and 55 Pa or less when air is passed through the pre-collection film at a flow velocity of 5.3 cm/s,
a collection efficiency of polyalphaolefin particles having a particle size of 0.3 μm at which air containing the polyalphaolefin particles is passed through the pre-collection film at a flow velocity of 5.3 cm/s is 25% or more and less than 80%, and
a PF value of the pre-collection film calculated from formula PF={−log((100−collection efficiency (%))/100)}/(pressure loss (Pa)/1000) using pressure loss and collection efficiency determined from polyalphaolefin particles having a particle size of 0.3 μm is 7 or more and 15 or less.

10. The air filter medium according to claim 1,
wherein at least the portion with a filling factor of 3.5% or less of the fluororesin porous film contains a modified polytetrafluoroethylene.

11. The air filter medium according to claim 1,
wherein at least the portion with a filling factor of 3.5% or less of the fluororesin porous film contains a fibril-forming polytetrafluoroethylene, a non-fibril-forming non-melting-processable component, and a non-fibril-forming melting-processable component having a melting point of lower than 320° C.

12. The air filter medium according to claim 1, further comprising:

an air-permeable supporting layer disposed on an upstream side and/or a downstream side of an air flow with respect to the fluororesin porous film.

13. The air filter medium according to claim 1, wherein the fluororesin porous film having a portion with a filling factor of 3.5% or less and with an average pore diameter of 5.76 μm or more and 15.99 μm or less, and the portion with a filling factor of 3.5% or less and with an average pore diameter of 5.76 μm or more has a thickness of 150 μm or more and 280.3 μm or less.

14. The air filter medium according to claim 1, wherein the fluororesin porous film having a portion with a filling factor of 3.5% or less, with an average pore diameter of 4.82 μm and with a collection efficiency of polyalphaolefin particles having a particle size of 0.3 μm at which air containing the polyalphaolefin particles is passed through the portion at a flow velocity of 5.3 cm/s is 99.999982% or more, and the portion with a filling factor of 3.5% or less, with an average pore diameter of 4.82 μm or more and with a collection efficiency of polyalphaolefin particles having a particle size of 0.3 μm at which air containing the polyalphaolefin particles is passed through the portion at a flow velocity of 5.3 cm/s is 99.999982% or more has a thickness of 150 μm or more and 179.3 μm or less.

15. The air filter medium according to claim 1, wherein the fluororesin porous film having a portion with a filling factor of 3.5% or less, with an average pore diameter of 5.76 μm and with a collection efficiency of polyalphaolefin particles having a particle size of 0.3 μm at which air containing the polyalphaolefin particles is passed through the portion at a flow velocity of 5.3 cm/s is 99.997508% or more, and the portion with a filling factor of 3.5% or less, with an average pore diameter of 5.76 μm or more and with a collection efficiency of polyalphaolefin particles having a particle size of 0.3 μm at which air containing the polyalphaolefin particles is passed through the portion at a flow velocity of 5.3 cm/s is 99.997508% or more has a thickness of 150 μm or more and 198.7 μm or less.

16. A filter pack comprising:

the air filter medium according to claim 1, wherein the air filter medium is processed so as to have a zigzag shape in which mountain folds and valley folds are alternately repeated.

17. An air filter unit comprising:

the air filter medium according to claim 1; and a frame body holding the air filter medium.

18. An air filter medium comprising, a fluororesin porous film having a portion with a filling factor of 3.5% or less, with a pressure loss of 49 Pa or less when air is passed through the portion at a flow velocity of 5.3 cm/s, and with a collection efficiency of polyalphaolefin particles having a particle size of 0.3 μm at which air containing the polyalphaolefin particles is passed through the portion at a flow velocity of 5.3 cm/s is 99.277725% or more, wherein the portion has a thickness of 150 μm or more and 386.0 μm or less.

* * * * *